US012225504B2

(12) United States Patent
Ashraf et al.

(10) Patent No.: US 12,225,504 B2
(45) Date of Patent: Feb. 11, 2025

(54) METHODS OF RESOURCE SELECTION FOR SIDELINK MULTI-STREAM TRANSMISSION IN WIRELESS COMMUNICATIONS SYSTEMS AND RELATED APPARATUSES

(71) Applicant: Telefonaktiebolaget LM Ericsson (publ), Stockholm (SE)

(72) Inventors: Shehzad Ali Ashraf, Aachen (DE); Ricardo Blasco Serrano, Espoo (FI); Wanlu Sun, San Diego, CA (US); Stefano Sorrentino, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 545 days.

(21) Appl. No.: 17/282,404

(22) PCT Filed: Sep. 19, 2019

(86) PCT No.: PCT/EP2019/075254
§ 371 (c)(1),
(2) Date: Apr. 2, 2021

(87) PCT Pub. No.: WO2020/069879
PCT Pub. Date: Apr. 9, 2020

(65) Prior Publication Data
US 2021/0392620 A1 Dec. 16, 2021

Related U.S. Application Data

(60) Provisional application No. 62/741,264, filed on Oct. 4, 2018.

(51) Int. Cl.
*H04W 72/02* (2009.01)
*H04L 5/00* (2006.01)
(Continued)

(52) U.S. Cl.
CPC .............. *H04W 72/02* (2013.01); *H04L 5/005* (2013.01); *H04W 72/0446* (2013.01);
(Continued)

(58) Field of Classification Search
CPC . H04W 72/02; H04W 72/54; H04W 72/0446; H04W 72/1263; H04L 5/005
See application file for complete search history.

(56) References Cited

U.S. PATENT DOCUMENTS

2011/0019637 A1* 1/2011 Ojala ................... H04L 1/0026
370/329
2019/0052411 A1* 2/2019 Chae ................... H04W 52/242
(Continued)

FOREIGN PATENT DOCUMENTS

| WO | 2017138802 A1 | 8/2017 |
| WO | 2018/055813 A1 | 3/2018 |
| WO | 2018/174661 A1 | 9/2018 |

OTHER PUBLICATIONS

International Search Report and Written Opinion mailed Dec. 18, 2019 for International Patent Application No. PCT/EP2019/075254, 22 pages.
Office Action mailed Oct. 8, 2020 for Taiwanese Patent Application No. 108135795, 24 pages. (English translation Included).
(Continued)

*Primary Examiner* — Kevin M Cunningham
(74) *Attorney, Agent, or Firm* — Sage Patent Group

(57) ABSTRACT

A method of operating a user equipment, UE, for device-to-device, D2D, transmission of a channel state information, CSI, report and/or a CSI reference signal, CSI-RS, is provided. The method may include identifying a CSI selection window containing candidate resources for use in D2D transmission of the CSI report and/or CSI-RS. The method may include identifying a data selection window containing candidate resources for use in D2D transmission of data and which at least partially overlaps a region of the CSI selection window. The method may include controlling transmission
(Continued)

of data and the CSI report and/or CSI-RS to use at least one resource that is selected within the overlapping region of the CSI selection window and the data selection window.

18 Claims, 21 Drawing Sheets

(51) Int. Cl.
  *H04W 72/0446* (2023.01)
  *H04W 72/0453* (2023.01)
  *H04W 72/1263* (2023.01)
  *H04W 72/54* (2023.01)

(52) U.S. Cl.
  CPC ... *H04W 72/0453* (2013.01); *H04W 72/1263* (2013.01); *H04W 72/54* (2023.01)

(56) References Cited

U.S. PATENT DOCUMENTS

| | | | |
|---|---|---|---|
| 2019/0173611 A1* | 6/2019 | Liu | H04L 5/0055 |
| 2019/0246385 A1* | 8/2019 | Lin | H04L 5/0094 |
| 2020/0127721 A1* | 4/2020 | Li | H04B 7/0486 |
| 2020/0137738 A1* | 4/2020 | Liu | H04W 72/20 |
| 2021/0243749 A1* | 8/2021 | Hoang | H04W 72/02 |
| 2021/0391906 A1* | 12/2021 | Oteri | H04L 5/0048 |

OTHER PUBLICATIONS

Ericsson, "Support of Unicast, Groupcast and Broadcast on the NR Sidelink", 3GPP TSG-RAN WG1 Meeting #94-Bis, R1-1811591, Chengdu, China, Sep. 28, 2018, 10 pages.

Chinese Office Action, Chinese Application No. 201980080821.1, mailed Mar. 25, 2024, 7 pages.

* cited by examiner

METHODS OF RESOURCE SELECTION FOR SIDELINK MULTI-STREAM TRANSMISSION IN WIRELESS COMMUNICATIONS SYSTEMS AND RELATED APPARATUSES

CROSS REFERENCE TO RELATED APPLICATIONS

This application is a 35 U.S.C. § 371 national stage application of PCT International Application No. PCT/EP2019/075254 filed on Sep. 19, 2019, which in turn claims domestic priority to U.S. Provisional Patent Application No. 62/741,264 filed on Oct. 4, 2018, the disclosures and content of which are incorporated by reference herein in their entirety.

The present disclosure relates generally to communications, and more particularly, to wireless communications and related wireless devices and network nodes.

LTE (Long Term Evolution) vehicle-to-anything (V2X) was first specified in 3GPP Release 14 of 3GPP LTE and is currently under investigation for 3GPP Release 15. LTE V2X includes new features and enhancements that allow for vehicular communications. One of the most relevant aspects is the introduction of direct vehicle-to-vehicle (V2V) communication functionalities. The specifications support other type of V2X communications, including V2P (vehicle-to-pedestrian or pedestrian-to-vehicle), V2I (vehicle-to-infrastructure), etc., as shown in FIG. 1.

These direct communication functionalities are built upon LTE D2D (device to device), also known as ProSe (Proximity Services), as first specified in the Release 12 of LTE, and include many important enhancements targeting the specific characteristics of vehicular communications. For example, LTE V2X operation is possible with and without network coverage and with varying degrees of interaction between the UEs (user equipments) and the NW (network), including support for standalone, network-less operation. To enhance the system level performance under high device density while meeting the latency requirements of V2X, new transmission modes (also referred to as resource allocation modes) were introduced: Mode 3 and Mode 4. In Mode 3, the NW is in charge of performing resource allocation whereas in Mode 4, the UE autonomously selects the resources for its own transmissions. At least some embodiments of the present disclosure are described herein in the operational environment of Mode 4.

For 5G NR (5th Generation New Radio) corresponding modes as for LTE are specified. NR Mode 1 corresponds to LTE Mode 3, and NR Mode 2 corresponds to LTE Mode 4. For the rest of the application Mode 4 refers to LTE Mode 4. If NR Modes are mentioned they are explicitly referred as NR Mode 1 or NR mode 2.

1. Autonomous Resource Selection of Mode 4 Transmissions

In Sidelink (SL) transmission mode 4, distributed resource selection is employed, i.e., there is no central node for scheduling and UEs play the same role in autonomous resource selection. Transmission Mode 4 is based on two functionalities: semi-persistent transmission and sensing-based resource allocation. Semi-persistent transmission is a type of transmission in which the UE sending a message also notifies the receivers about its intention to transmit using certain time-frequency resources at a later point in time. For example, a UE transmitting at time T informs the receivers that it will transmit using the same frequency resources at time T+100 ms. This is called resource reservation or resource booking and is especially suitable for the type of vehicular applications targeted by LTE Release 14 which relies on the periodic transmission of packets.

Semi-persistent transmission allows a UE to predict the utilization of the radio resources in the future. That is, by listening to the current transmissions of another UE, it also obtains information about potential future transmissions. This information can be used by the UE to avoid collisions when selecting its own resources. Specifically, a UE predicts the future utilization of the radio resources by reading received booking messages and then schedules its current transmission to avoid using the same resources. This is known as sensing-based resource selection.

The sensing-based resource selection scheme specified in Rel-14 can include the following steps.
1. A UE senses the transmission medium during an interval [n−a, n−b], where n is an arbitrary time reference, and a>b≥0 defined the duration of the sensing window.
2. Based on the sensing results, the UE predicts the future utilization of the transmission medium at a future time interval [n+T1, n+T2], where T2>T1≥0. Here [n+T1, n+T2] can be interpreted as the resource selection window of data transmission.
3. The UE selects one or more time-frequency resources within the window [n+T1, n+T2]. The selection is performed according to an algorithm that is defined in the specification TS 36.213.

The algorithm details for the sensing procedure, i.e., enumerated step 1) described above, can include the following three key sub-steps.
Sub-step 1: all the resources are considered available.
Sub-step 2: UE excludes resources at least based on scheduling assignment (SA) decoding and additional conditions. A resource is excluded if it is indicated or reserved by a decoded SA and PHY Sidelink Shared Channel (PSSCH) reference signal received power (RSRP) measurement in the associated data resources is above a threshold.
Sub-step 3: UE measures and ranks the remaining PSSCH resources based on RSSI measurement and selects a subset. The subset is the set of candidate resources with the lowest total received energy. The size of the subset is, e.g., 20%, of the total resources within the selection window.

2. Unicast/Multicast for NR V2X

LTE V2X design only aims at broadcast services. However, in current 3GPP New Radio (NR) studies, it is expected that unicast and multicast V2X transmissions will also become important since they are indeed needed for some eV2X use cases, e.g., platooning, see-through, and cooperative maneuvering. For unicast/multicast, the Channel State Information (CSI) reports from target receiver(s) can be beneficial for many aspects, e.g., link adaptation, multi-antenna transmission schemes, and resource allocation.

3. Periodic CSI Report and Periodic CSI Reference Signal CSI-RS

In NR and LTE, periodic CSI report and periodic CSI-RS are configured by higher layer, e.g., Radio Resource Control (RRC). From transmission time perspective, the CSI report (or CSI-RS) configuration specifies: the CSI report (or CSI-RS) periodicity; the CSI report (or CSI-RS) subframe offset within the CSI report (or CSI-RS) period. Then, based on some pre-configured mathematical formulas, a UE knows to use which slots to transmit CSI report (or to expect CSI-RS from which slots).

For example, consider periodic channel quality indicator (CQI) report $N_{pd}$ and $N_{OFFSET,CQI}$ denote its periodicity in slots and slot offset within a reporting period, respectively. Then the slots used to report CQI are decided by $$(10 \times n_f + \lfloor n_s/2 \rfloor - N_{OFFSET,CQI}) \mod(N_{pd}) = 0$$

where $n_f$ denotes the system frame number (SFN), and $n_s$ represents the slot number within a radio frame.

In NR, semi-persistent CSI-RS and semi-persistent CSI report are also supported and the respective configuration is done by higher layer, e.g., RRC. On the other hand, the activation/deactivation is done dynamically, e.g., by medium access control (MAC) control element (CE) and/or downlink control information (DCI).

Potential Problems with Previously Known Approaches

The SL V2X studies of release 14 and release 15 focus on broadcast and thus don't consider SL CSI report or SL CSI-RS. The mechanism used for transmitting periodic CSI report and periodic CSI-RS in cellular links (i.e., Uu links) cannot be applied to SL Mode 4 transmissions, due to the lack of a central controller.

SUMMARY

According to some embodiments of inventive concepts, a method is provided to operate a user equipment, UE, for device-to-device, D2D, transmission of a channel state information, CSI, report and/or a CSI reference signal, CSI-RS. The method includes identifying a CSI selection window containing candidate resources for use in D2D transmission of the CSI report and/or CSI-RS. The method further includes identifying a data selection window containing candidate resources for use in D2D transmission of data and which at least partially overlaps a region of the CSI selection window. The method further includes controlling transmission of data and the CSI report and/or CSI-RS to use at least one resource that is selected within the overlapping region of the CSI selection window and the data selection window.

A potential advantage of the controlling of transmission of data and the CSI report and/or CSI-RS to use at least one resource that is selected within the overlapping region of the CSI selection window and the data selection window is that the operation reduces the problems associated with half-duplex, resource fragmentation, and reduces inter-modulation distortion.

According to other embodiments of inventive concepts, a method is provided to operate a user equipment, UE, for device-to-device, D2D, data transmissions. The method includes identifying a first data stream selection window containing candidate resources for use in D2D transmission of data of the first data stream. The method further includes identifying a second data stream selection window containing candidate resources for use in D2D transmission of data of the second data stream and which at least partially overlaps a region of the first data stream selection window. The method further includes controlling transmission of data of the first and second data streams to use at least one resource that is selected within the overlapping region of the first and second data stream selection windows.

According to some other embodiments of inventive concepts, a method of operating a user equipment, UE, for device-to-device, D2D, transmission of a channel state information, CSI, report and/or a CSI reference signal, CSI-RS is provided. The method includes determining a time location of a CSI selection window containing candidate resources for use in D2D transmission of the CSI report and/or CSI-RS, based on a time when another CSI report and/or CSI-RS was previously transmitted, periodicity of CSI reports and/or CSI-RS transmissions, and width of the CSI selection window. The method further includes controlling (1702) transmission of the CSI report and/or CSI-RS to use at least one resource that is selected within the CSI selection window.

According to yet other embodiments of inventive concepts, a method of operating a user equipment, UE, for device-to-device, D2D, transmission of a channel state information, CSI, report and/or a CSI reference signal, CSI-RS is provided. The method includes determining a time location of a CSI selection window containing candidate resources for use in D2D transmission of the CSI report and/or CSI-RS, based on a D2D frame number, periodicity of CSI reports and/or CSI-RS transmissions, and width of the CSI selection window. The method further includes controlling transmission of the CSI report and/or CSI-RS to use at least one resource that is selected within the CSI selection window.

According to some embodiments of inventive concepts, a user equipment, UE is provided to perform operations for device-to-device, D2D, transmission of a channel state information, CSI, report and/or a CSI reference signal, CSI-RS. The operations include identifying a CSI selection window containing candidate resources for use in D2D transmission of the CSI report and/or CSI-RS. The operations further include identifying a data selection window containing candidate resources for use in D2D transmission of data and which at least partially overlaps a region of the CSI selection window. The operations further include controlling transmission of data and the CSI report and/or CSI-RS to use at least one resource that is selected within the overlapping region of the CSI selection window and the data selection window.

According to other embodiments of inventive concepts, a user equipment, UE, is provided to perform operations for device-to-device, D2D, transmission. The operations include identifying a first data stream selection window containing candidate resources for use in D2D transmission of data of the first data stream. The operations further include identifying a second data stream selection window containing candidate resources for use in D2D transmission of data of the second data stream and which at least partially overlaps a region of the first data stream selection window. The operations further include controlling transmission of data of the first and second data streams to use at least one resource that is selected within the overlapping region of the first and second data stream selection windows.

According to some embodiments of inventive concepts, a user equipment, UE, is provided to perform operations for device-to-device, D2D, transmission of a channel state information, CSI, report and/or a CSI reference signal, CSI-RS. The operations include determining a time location of a CSI selection window containing candidate resources for use in D2D transmission of the CSI report and/or CSI-RS, based on a time when another CSI report and/or CSI-RS was previously transmitted, periodicity of CSI reports and/or CSI-RS transmissions, and width of the CSI selection window. The operations further include controlling transmission of the CSI report and/or CSI-RS to use at least one resource that is selected within the CSI selection window.

According to yet other embodiments of inventive concepts, a user equipment, UE, is provided to perform operations for device-to-device, D2D, transmission of a channel state information, CSI, report and/or a CSI reference signal, CSI-RS, The operations include determining a time location of a CSI selection window containing candidate resources for use in D2D transmission of the CSI report and/or CSI-RS, based on a D2D frame number, periodicity of CSI reports and/or CSI-RS transmissions, and width of the CSI selection window. The operations further include controlling transmission of the CSI report and/or CSI-RS to use at least one resource that is selected within the CSI selection window.

According to some embodiments of inventive concepts, a computer program comprising program code to be executed by at least one processor of a user equipment, UE, is provided whereby execution of the program code causes the UE to perform operations including identifying a CSI selection window containing candidate resources for use in D2D transmission of the CSI report and/or CSI-RS. The operations further include identifying a data selection window containing candidate resources for use in D2D transmission of data and which at least partially overlaps a region of the CSI selection window. The operations further include controlling transmission of data and the CSI report and/or CSI-RS to use at least one resource that is selected within the overlapping region of the CSI selection window and the data selection window.

According to other embodiments of inventive concepts, a computer program comprising program code to be executed by at least one processor (2003) of a user equipment, UE, is provided whereby execution of the program code causes the UE to perform operations including identifying a first data stream selection window containing candidate resources for use in D2D transmission of data of the first data stream. The operations further include identifying a second data stream selection window containing candidate resources for use in D2D transmission of data of the second data stream and which at least partially overlaps a region of the first data stream selection window. The operations further include controlling transmission of data of the first and second data streams to use at least one resource that is selected within the overlapping region of the first and second data stream selection windows.

According to yet other embodiments of inventive concepts, a computer program comprising program code to be executed by at least one processor of a user equipment, UE, whereby execution of the program code causes the UE to perform operations including determining a time location of a CSI selection window containing candidate resources for use in D2D transmission of the CSI report and/or CSI-RS, based on a time when another CSI report and/or CSI-RS was previously transmitted, periodicity of CSI reports and/or CSI-RS transmissions, and width of the CSI selection window. The operations further include controlling transmission of the CSI report and/or CSI-RS to use at least one resource that is selected within the CSI selection window.

According to further embodiments of inventive concepts, a computer program comprising program code to be executed by at least one processor of a user equipment, UE, whereby execution of the program code causes the UE to perform operations including determining a time location of a CSI selection window containing candidate resources for use in D2D transmission of the CSI report and/or CSI-RS, based on a D2D frame number, periodicity of CSI reports and/or CSI-RS transmissions, and width of the CSI selection window. The operations further include controlling transmission of the CSI report and/or CSI-RS to use at least one resource that is selected within the CSI selection window.

According to some embodiments of inventive concepts, a method of operating a network node to control device-to-device, D2D, transmission by a user equipment, UE, of a channel state information, CSI, report and/or a CSI reference signal, CSI-RS is provided. The method includes determining a criteria to be used by the UE for selection of a CSI report and/or CSI-RS transmission resource and a data transmission resource within an overlapping region of a CSI selection window and a data selection window. The method further includes transmitting an indication of the criteria to the UE.

According to other embodiments of inventive concepts, a network node is provided to perform operations to control device-to-device, D2D, transmission by a user equipment, UE, of a channel state information, CSI, report and/or a CSI reference signal, CSI-RS. The operations include determining a criteria to be used by the UE for selection of a CSI report and/or CSI-RS transmission resource and a data transmission resource within an overlapping region of a CSI selection window and a data selection window. The operations further include transmitting an indication of the criteria to the UE.

According to yet other embodiments of inventive concepts, a computer program comprising program code to be executed by at least one processor of a network node is provided whereby execution of the program code causes the network node to perform operations including determining a criteria to be used by the UE for selection of a CSI report and/or CSI-RS transmission resource and a data transmission resource within an overlapping region of a CSI selection window and a data selection window. The operations further include transmitting an indication of the criteria to the UE.

Other methods, UEs, and computer program products according to embodiments of the inventive subject matter will be or become apparent to one with skill in the art upon review of the following drawings and detailed description. It is intended that all such additional methods, UEs, and computer program products be included within this description, be within the scope of the present inventive subject matter, and be protected by the accompanying claims. Moreover, it is intended that all embodiments disclosed herein can be implemented separately or combined in any way and/or combination.

BRIEF DESCRIPTION OF THE DRAWINGS

The accompanying drawings, which are included to provide a further understanding of the disclosure and are incorporated in a constitute a part of this application, illustrate certain non-limiting embodiments of inventive concepts. In the drawings.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Embodiments of the invention can be applied to LTE mode 4 or NR mode 2.

4. Overview of Present Approaches and Potential Advantages

Figure 1:
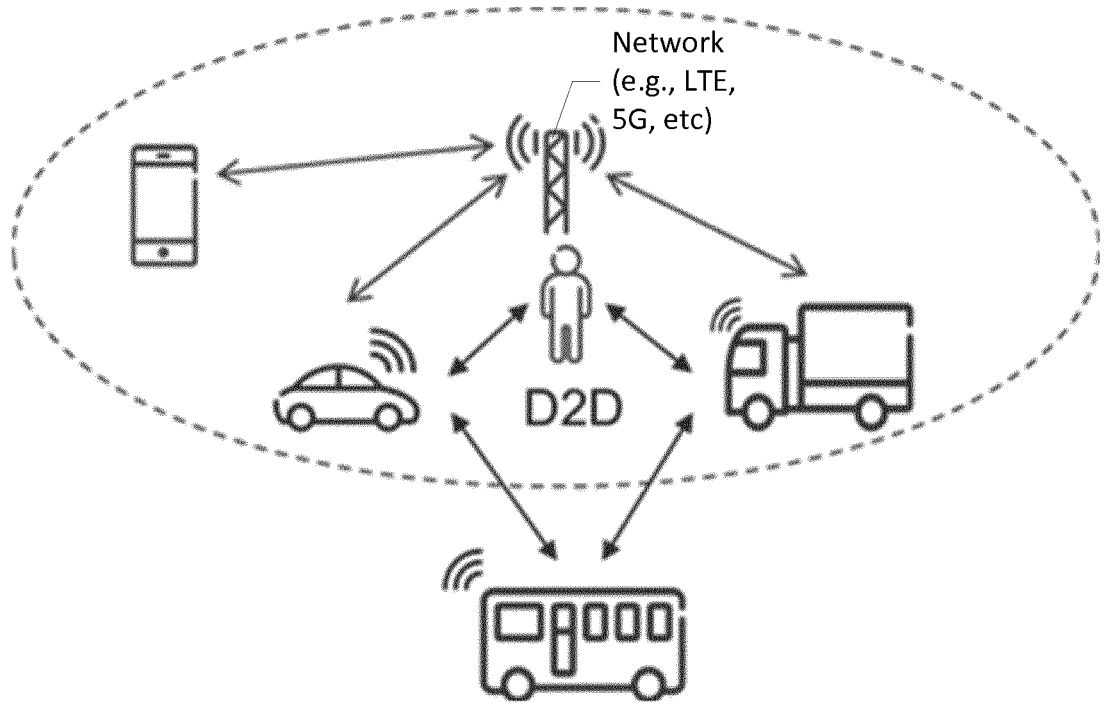
FIG. 1 illustrates an example V2X wireless communication network.
Figure 2A:
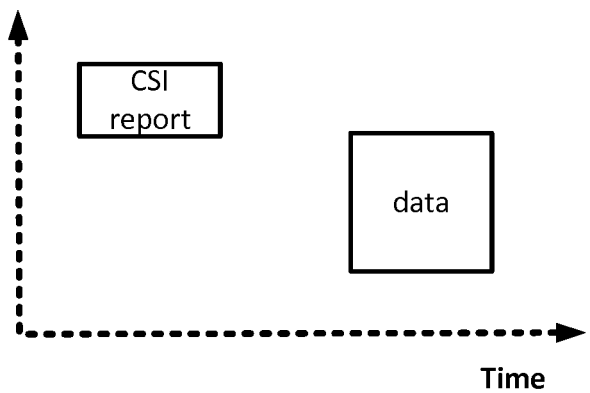
FIGS. 2a and 2b illustrate operations for resource selection.
Figure 2B:
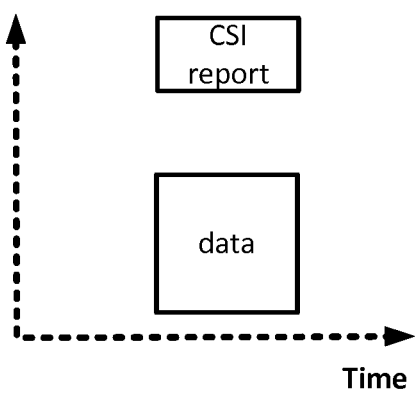

A presently proposed approach is to consider SL periodic CSI report partially according to SL periodic data traffic from scheduling perspective. Then, the typical Mode 4 resource selection mechanism can also be applied to periodic CSI report. In this way, the resource selections of SL CSI report and data are independent, which is however inefficient. Consider an example in the following. Let's assume, UE2 has both CSI report and data to transmit to UE1. With the independent resource selection, the two situations in FIGS. 2a and 2b will happen very likely. With FIG. 2a, the half-duplex issue becomes more severe, which degrades not only potential signal reception but also the sensing procedure. Note that due to half-duplex constraint, when a UE is transmitting, it cannot either receive signal or sense or measure the channel. Additionally, with FIG. 2b, the non-adjacent frequency allocation of CSI report and data transmission will bring more severe issue of inter-modulation distortion. Note that inter-modulation is the amplitude of signals containing two or more different frequencies, caused by nonlinearities in a system. Moreover, with both FIG. 2a and FIG. 2b, the resource fragmentation problem becomes worse, which leads to inefficient resource utilization. Note that SL CSI report typically has small payload compared to data transmission.

Although operations are described herein primarily in the context of SL communications, these operations are not limited thereto. The operations may be used more generally in device-to-device (D2D) communications. Accordingly, it is to be understood that the term "sidelink" or "SL" used in the disclosure herein and accompanying drawings may be replaced with the term "device-to-device" or "D2D."

Some embodiments disclosed herein are directed to operations for resource selection for multi-stream transmissions, with a particular applicability to SL CSI report. The multi-stream transmissions are from the same UE, which can be SL CSI report+SL data transmission, SL data A transmission+SL data B transmission, SL control information transmission+SL data transmission, etc. Various embodiments are described below in the example context of =SL CSI report+potential data transmission.

The operations of at least some embodiments can be directed to one or both of the following two aspects:
1) Efficiently selecting a resource for transmitting SL CSI report, especially when there is also potential data transmission from the same UE. For this purpose, resource selections of SL CSI report and data transmission are jointly considered to improve resource utilization.
2) Achieving a good trade-off between keeping enough candidate resources and maintaining the periodic feature of SL periodic CSI report, by various operations that pre-configure or otherwise configure a window, together with the periodicity, to a UE, which indicates the allowed time variations of the SL periodic CSI report.

Various embodiments may provide one or more of the following operational advantages for more efficient utilization of resources:
1. Reduced half-duplex issues, which is particularly useful for sidelink communications where sensing is needed for Mode 4 resource selection.
2. Reduced resource fragmentation issues, which can further reduce the overhead of the signaling used to indicate the selected resources.
3. Reduced issues of inter-modulation distortion, which can lower the interference to other simultaneous transmissions.

5. Various Presently Disclosed Embodiments

Various embodiments below are described in the context of SL or V2X communications but may additionally be advantageously applied to other wireless communication scenarios especially the scenarios including ad hoc networks.

These and other embodiments are also described in the context of the SL CSI report but they can also be advantageously applied to SL CSI-RS or other potential SL transmissions including both control signaling and data.

In the following description, a resource can be interpreted as an integer multiple of subchannels, where a subchannel is defined as the smallest unit of resource allocation.

Various embodiments are directed to resource selection for SL CSI report. Related operations are disclosed which are directed: 1) how to select a resource for transmitting SL CSI report; 2) how to determine the candidate slots for transmitting SL periodic CSI report; 3) how to determine the window width for SL periodic CSI report; 4) signaling aspects; 5) potential extensions to other transmissions.

6. Embodiments Directed to Selecting Resource for Transmitting SL CSI Report When selecting resources for SL CSI report, first a valid selection window should be identified, which contains the candidate resources/slots for selection. Note that for LTE Rel-14/15 Mode-4 UEs, the time interval [n+T1, n+T2] described above in Section 1 "Autonomous resource selection of Mode 4 transmissions" should be interpreted as the selection window of data transmissions. Now, in NR, for SL aperiodic CSI report, the selection window can be determined by considering the deadline of the CSI report and/or UE capability aspects. Additionally, for SL periodic CSI report, the selection window can be determined by the embodiments that will be described later in the Section 7 "Embodiments directed to determining candidate slot(s) for transmitting SL periodic CSI report."

After a selection window is determined for SL CSI report, the next step is to select a resource within the window for transmitting the CSI report. Within these operations, there are several aspects that are considered especially when there is also (potential) data transmission from the same UE. More specifically, the several issues explained in Section 4 "Potential Problems with Previously Existing Approaches and Advantages of Present Approaches", i.e., half-duplex, resource fragmentation, and inter-modulation distortion, need to be tackled if possible. For this purpose, the resource selection of CSI report can operate to take into account the resource selection of data or the resources that have already been allocated to data transmission from the same UE.

Some example embodiments are described below. Embodiments 1.1 and 1.2 are relevant for the cases when resource selections of CSI report and data transmissions are performed simultaneously. On the other hand, Embodiments 1.3 and 1.4 are relevant for the cases when resource allocation of data transmission from the same UE has already been done and resource selection is currently performed only for SL CSI report. Moreover, Embodiment 1.5 is relevant for the case of CSI report alone transmission, i.e., no (potential) data transmission from the same UE.

FIGS. 13-18 are flowcharts of operations performed by UE for SL transmission of a CSI report and/or a CSI-RS in accordance with some embodiments.

Figure 13:
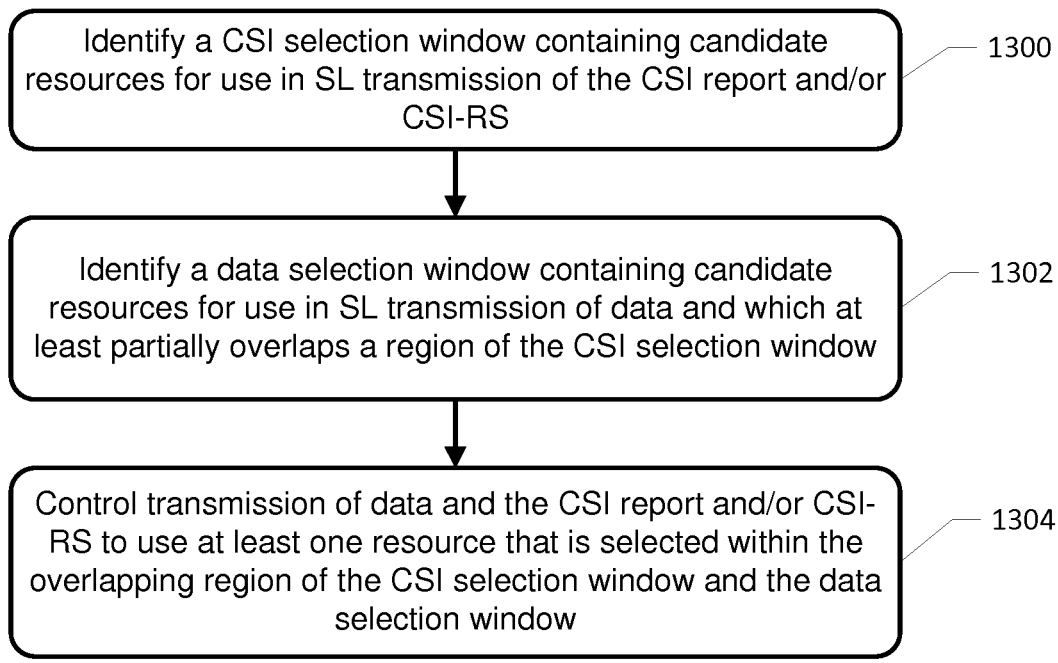
FIGS. 13-18 are flowcharts of operations performed by UE for SL transmission of a CSI report and/or a CSI-RS in accordance with some embodiments.

FIG. 13 illustrates operations that can be performed by a UE for SL transmission of a CSI report and/or a CSI reference signal (CSI-RS), in accordance with some embodiments. Referring to FIG. 13, the operations identify 1300 a CSI selection window containing candidate resources for use in SL transmission of the CSI report and/or CSI-RS. The operations identify 1302 a data selection window containing candidate resources for use in SL transmission of data and which at least partially overlaps a region of the CSI selection window. The operations then control 1304 transmission of data and the CSI report and/or CSI-RS to use at least one resource that is selected within the overlapping region of the CSI selection window and the data selection window.

The operation to identify 1302 the data selection window can be performed to satisfy a deadline for transmission of the CSI report and/or CSI-RS and/or responsive to a defined UE operational capability.

The operation to transmit 1304 the CSI report and/or CSI-RS can be configured to transmit a CSI report without transmission of CSI-RS. Alternatively, the operation to transmit 1304 the CSI report and/or CSI-RS can be configured to transmit a CSI-RS without transmission of a CSI report.

6.1 Embodiment 1.1

In some cases, resource selections of CSI report and data transmissions are performed simultaneously and there are overlaps of their respective selection windows, i.e., their respective candidate slots. Note that for data transmission, the time window [n+T1, n+T2] given in Section 1 is considered as its selection window, where n is the time instance when resource selection is performed. Then, if certain condition is satisfied, the UE may select two frequency-adjacent resources in the same slot for CSI report and data transmissions respectively, where the same slot belongs to the overlapped slots of the two resource selection windows. In this way, the problems of half-duplex, resource fragmentation, and inter-modulation distortion can be reduced.

Figure 3:
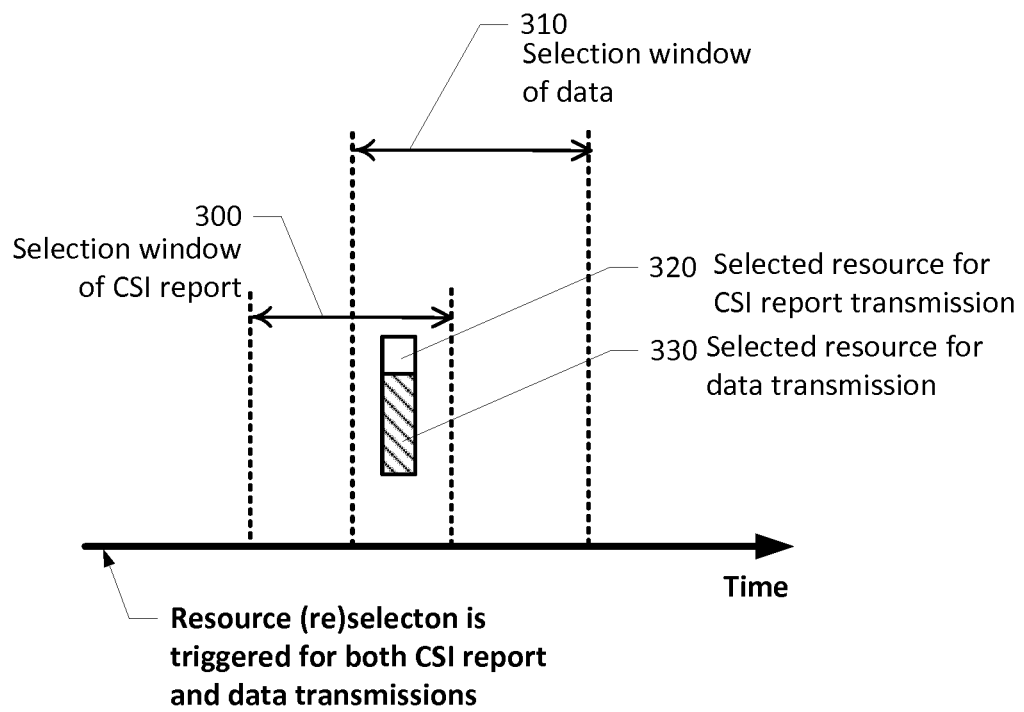
FIG. 3 illustrates a time graph and corresponding operations for using frequency-adjacent resources in the same slot for CSI report and data transmissions, in accordance with some embodiments.

An example of the embodiment is illustrated in FIG. 3. FIG. 3 illustrates a time graph and corresponding operations for using frequency-adjacent resources in the same slot for CSI report and data transmissions. The certain condition referenced above can include, but is not limited to, any one or more of the entirety or a portion of any the following:
1. no SA is detected in the two corresponding resources within the sensing procedure;
2. even though SAs are detected in the two corresponding resources, the associated RSRP and/or RSSI measurements are below a (pre-)configured threshold; and
3. SA is detected in only one of the corresponding resources, but the associated RSRP and/or RSSI measurements are below a (pre-)configured threshold.
4. The number of available resources in the overlapping window is above a certain threshold. For instance, 20% of the total available resources within the selection window for data or CSI reports. In some examples, the threshold could also be defined as a percentage of union set of available resources within the selection window for both data and CSI reports.

Figure 4:
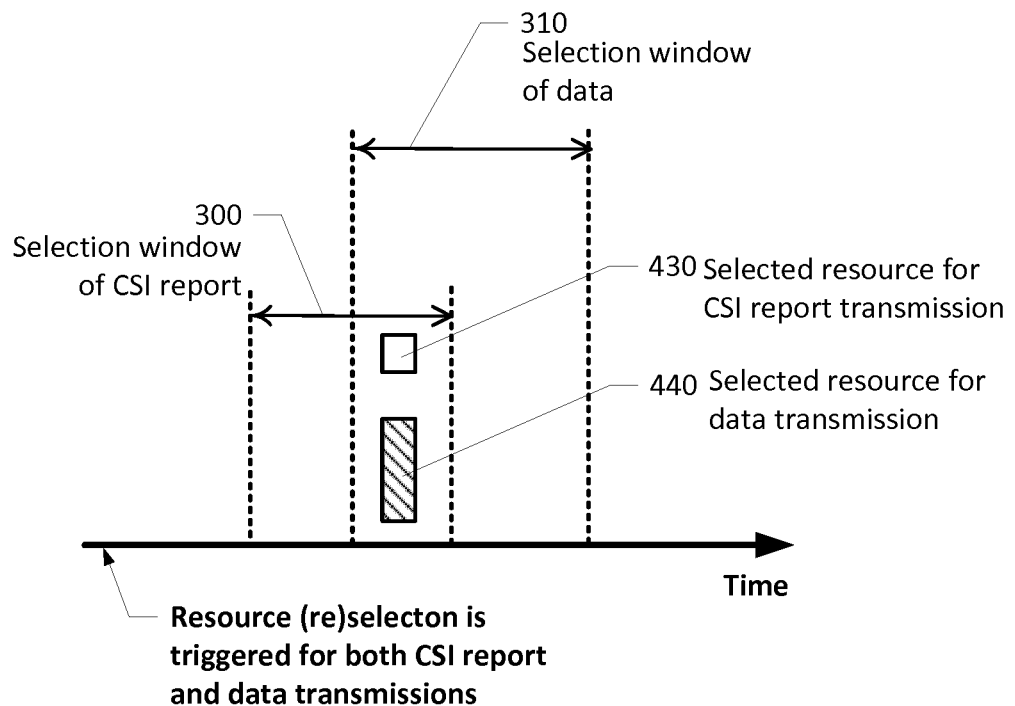
FIG. 4 illustrates a time graph and corresponding operations for using frequency-nonadjacent resources in the same slot for CSI report and data transmissions, in accordance with some embodiments.

In some other embodiments, resource selections 320 and 330 of CSI report and data transmissions are performed simultaneously, and the two selection windows 300 and 310 are overlapped. However, when there are no two frequency-adjacent resources that satisfy the above condition, the UE may responsively select two frequency-nonadjacent resources in the same slot, if the two resources satisfy the certain condition stated above. An example is illustrated in FIG. 4. FIG. 4 illustrates a time graph and corresponding operations for using frequency-nonadjacent resources 430 and 440 in the same slot for CSI report and data transmissions. In this way, the problems of half-duplex and resource fragmentation can be reduced, which gives better resource utilization.

In some other embodiments, resource selections of CSI report and data transmissions are performed simultaneously. However, there is no overlap of their respective selection windows, or the certain condition stated above is not satisfied for any two resources in the same slot. Then, the UE may independently select resources for CSI report and data transmissions within their own selection windows.

According to another sub-embodiment, the available resources are prioritized for selection based on the time window region it belongs. For instance, the resources belonging to overlapping region of the selection windows for data and CSI reports will have higher priority for selection as compared to the resources associated to non-overlapping region. This can be implemented by specifying or (pre-)configuring the selection probabilities. For example, resources in overlapping region have probability p1 and resources in overlapping region have probability p2, where p1>p2 and p1+p2=1. Note that p1, p2 gives the probabilities that the resources are selected. In another sub-embodiment, the prioritization of resources is only considered when resource selections of CSI report and data transmissions are performed simultaneously, and the certain condition stated above is satisfied.

Figure 14:
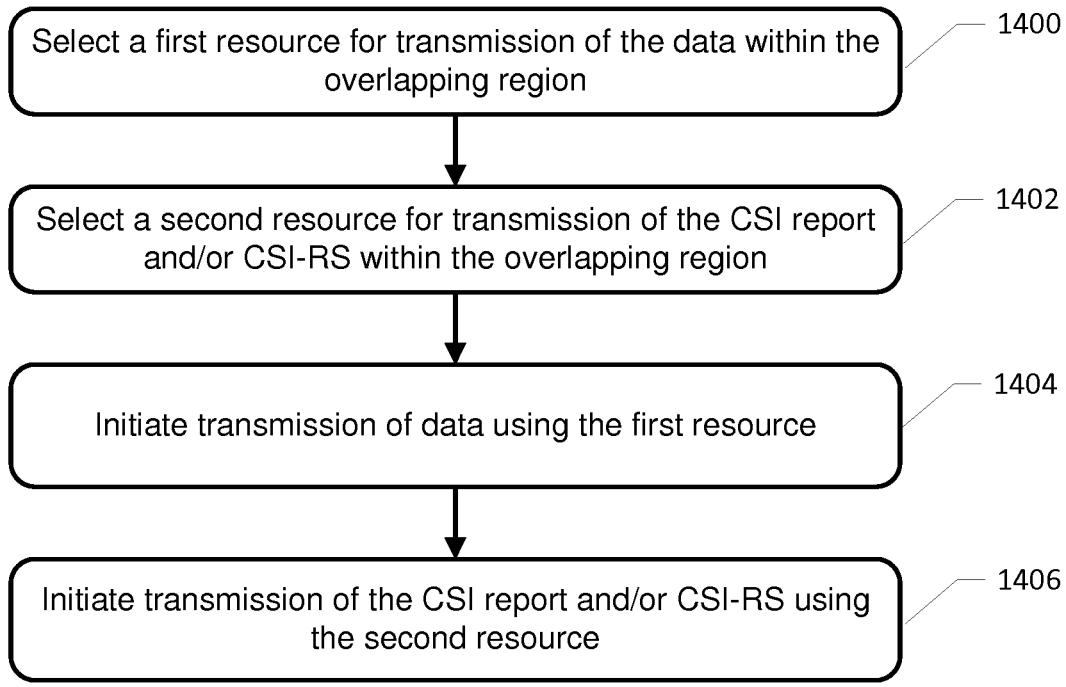

FIG. 14 illustrates corresponding operations that can be performed in accordance with some embodiments.

Referring to FIG. 14, the operation to control 1304 transmission of the data and the CSI report and/or CSI-RS to use the at least one resource that is selected within the overlapping region of the CSI selection window and the data selection window, can include: selecting 1400 a first resource for transmission of the data within the overlapping region of the CSI selection window and the data selection window; selecting 1402 a second resource for transmission of the CSI report and/or CSI-RS within the overlapping region of the CSI selection window and the data selection window; initiating 1404 transmission of data using the first resource; and initiating 1406 transmission of the CSI report and/or CSI-RS using the second resource.

The selection 1400 and 1402 of one of the first and second resources may be performed responsive to the selection of the other one of the first and second resources. Alternatively, the selection of the one of the first and second resources may be performed independently of the selection of the other one of the first and second resources.

The selection of the first and second resources may be controlled so they are frequency adjacent and in a same slot to each other. In one embodiment, the selection of the first and second resources to be frequency adjacent and in a same slot to each other is performed responsive to determining that any one or more of the following conditions is satisfied:
a) no scheduling assignment in the first and second resources is detected by the UE;
b) a scheduling assignment in the first and second resources is detected by the UE but an associated reference signal received power and/or a received signal strength indication measurement is below a first threshold value;
c) a scheduling assignment in one of the first and second resources is detected by the UE but the associated reference signal received power and/or the received signal strength indication measurement is below a second threshold value; and
d) a number of available resources within the region of the CSI selection window and the data selection window is above a third threshold value.

In another embodiment, the selection of the first and second resources to be frequency adjacent and in a same slot to each other is performed responsive to determining that any one or more of the following conditions is satisfied:
a) no scheduling assignment for the first and second resources is detected by the UE;
b) a scheduling assignment for one of the first and second resources is detected by the UE but an associated reference signal received power and/or a received signal strength indication measurement is below a first threshold value;
c) a scheduling assignment for one of the first and second resources is detected by the UE but the associated reference signal received power and/or the received signal strength indication measurement is below a second threshold value; and
d) a number of available resources within the region of the CSI selection window and the data selection window is above a third threshold value.

The selection 1400 and 1402 of the first and second resources may be controlled so they are frequency nonadjacent and in a same slot to each other.

6.2 Embodiment 1.2

Figure 5:
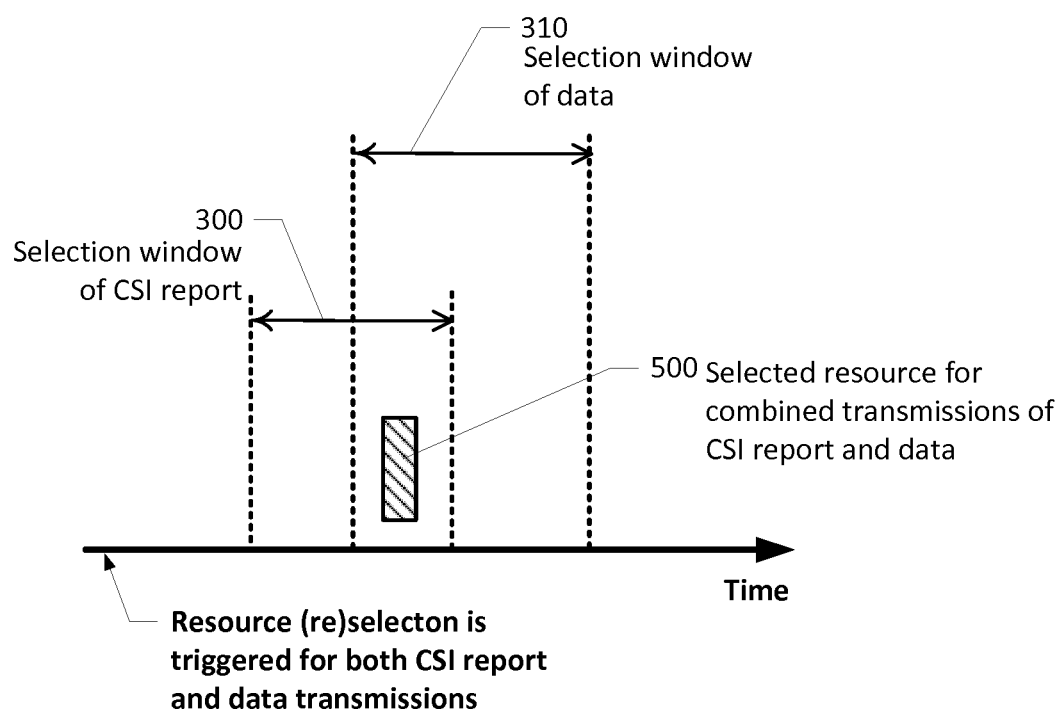
FIG. 5 illustrates a time graph and corresponding operations for selecting one resource to combine CSI report and data transmissions, in accordance with some embodiments.

In some cases, resource selections of CSI report and data transmissions are performed simultaneously and there are overlaps of their respective selection windows. Then, when certain condition is satisfied, the UE operates to responsively combine the transmissions of CSI report and data, i.e., select one resource to transmit both of them. Here the word 'combine' can be performed by different ways, e.g., jointly encoded, separately encoded, FDM, TDM, etc. Also, in addition to the above criteria, here the certain condition can further include, but not limited to, that the payload of SL CSI report is smaller than a pre-defined or (pre-)configured threshold, the payload of data is smaller than a pre-defined or (pre-)configured threshold, or the sum of the CSI report and data payloads is smaller than a pre-defined or (pre-)configured threshold. In this way, the problems of half-duplex, resource fragmentation, and inter-modulation distortion can be reduced. An example is illustrated in FIG. 5. FIG. 5 illustrates a time graph and corresponding operations for selecting one resource 500 to combine CSI report and data transmissions.

Figure 15:
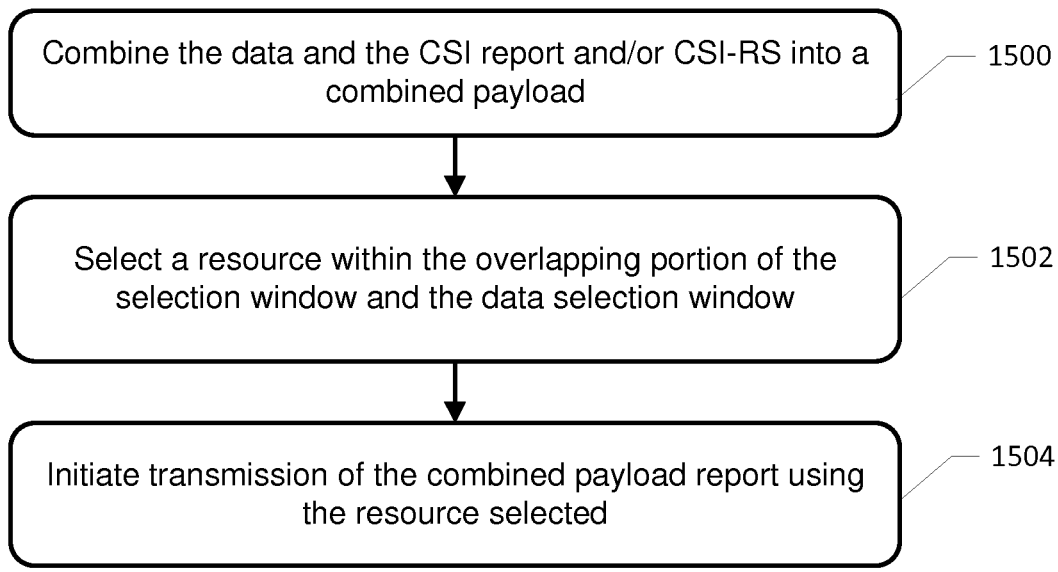

FIG. 15 illustrates corresponding operations that may be performed by the UE in accordance with some embodiments. Referring to FIG. 15, the operation to control 1304 transmission of the data and the CSI report and/or CSI-RS to use the at least one resource that is selected within the overlapping region of the CSI selection window and the data selection window, can include: combining 1500 the data and the CSI report and/or CSI-RS into a combined payload; selecting 1502 a resource within the overlapping portion of the selection window and the data selection window; and initiating 1504 transmission of the combined payload report using the resource selected.

The operation to combine 1500 the data and the CSI report and/or CSI-RS into a combined payload, can include generating the combined payload by any one or more of: 1) jointly encoding the data and the CSI report and/or CSI-RS; 2) separately encoding the data from the CSI report and/or CSI-RS and then combining the encoded data and the encoded CSI report and/or CSI-RS; 3) performing frequency division multiplexing of the data and the CSI report and/or CSI-RS to provide transmission of the combined payload report; and 4) performing time division multiplexing of the data and the CSI report and/or CSI-RS to provide transmission of the combined payload report.

The operations may further include signalling an indication of the combined payload in a scheduling assignment associated with the data.

The operation to control 1304 transmission of the data and the CSI report and/or CSI-RS to use the at least one resource that is selected within the overlapping region of the CSI selection window and the data selection window, can further include determining whether a condition is satisfied because at least one of the payload and the data is smaller than a defined threshold. The operation to combine the data and the CSI report and/or CSI-RS into the combined payload can be performed in response to determining that the condition is satisfied.

6.3 Embodiment 1.3

Figure 6:
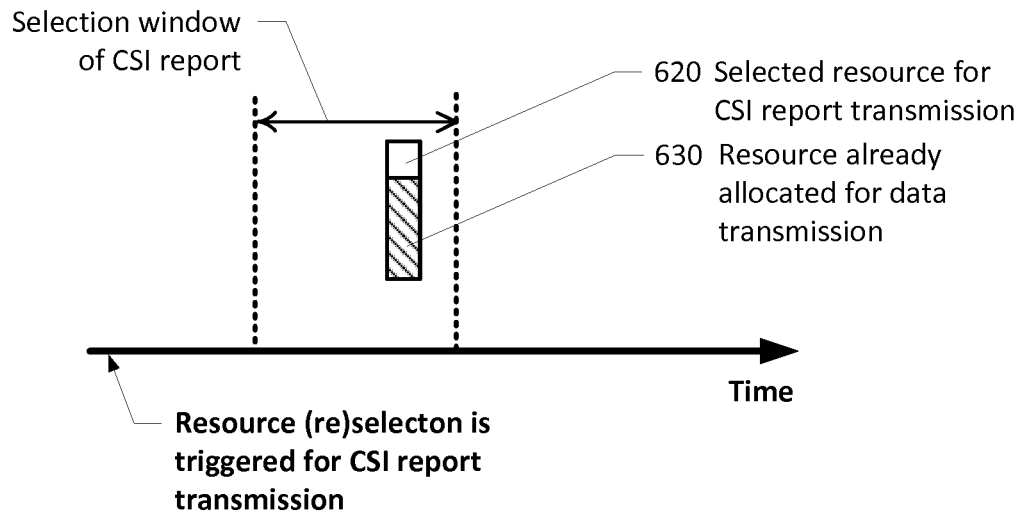
FIG. 6 illustrates a time graph and corresponding operations for selecting a resource for CSI report that is frequency-adjacent to the resource already allocated to data transmission, in accordance with some embodiments.

In some cases, resource selection for CSI report transmission is performed given that the resource allocation of data transmission from the same UE has already been done and the allocated resource belongs to the selection window of CSI report. Then, when the allocated resource and one of its frequency-adjacent resources in the same slot satisfy the certain condition described under Embodiment 1.1, the UE can responsively operate to select the frequency-adjacent resource for transmitting CSI report. In this way, the problems of half-duplex, resource fragmentation, and inter-modulation distortion can be reduced. An example of the embodiment is illustrated in FIG. 6. FIG. 6 illustrates a time graph and corresponding operations for selecting a resource 620 for CSI report that is frequency-adjacent to the resource 630 already allocated to data transmission. The phrase frequency-adjacent means that no resource is located between the selected resource that is in the same slot and the allocated resource for CSI report.

Figure 7:
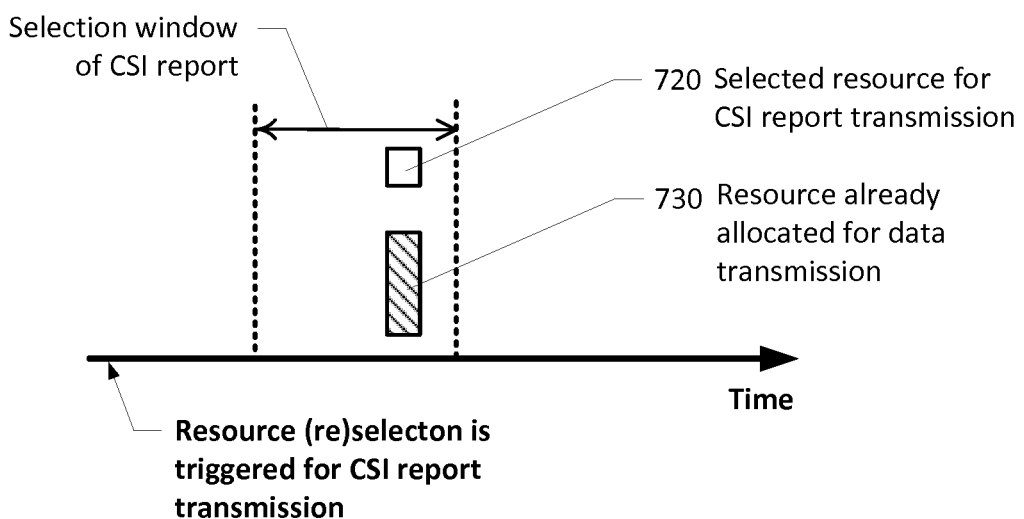
FIG. 7 illustrates a time graph and corresponding operations for selecting a resource for CSI report is frequency-nonadjacent to the resource already allocated to data transmission, in accordance with some embodiments.

In some cases, resource selection for CSI report transmission is performed given that the resource allocation of data transmission from the same UE has already been done and the allocated resource belongs to the selection window of CSI report. However, the allocated resource doesn't have its frequency-adjacent pair so that they satisfy the certain condition described according to Embodiment 1.1. Then, the UE may responsively operate to select a resource that is in the same slot but frequency-nonadjacent with the allocated resource for CSI report. The phrase frequency-nonadjacent means that at least one or a plurality of resources are located between the selected resource that is in the same slot and the allocated resource for CSI report. In this way, the problems of half-duplex and resource fragmentation can be reduced, which gives better resource utilization. An example of the embodiment is illustrated in FIG. 7. FIG. 7 illustrates a time graph and corresponding operations for selecting a resource 720 for CSI report is frequency-nonadjacent to the resource 730 already allocated to data transmission.

In some other cases, resource selection for CSI report transmission is performed given that the resource allocation of data transmission from the same UE has already been done. However, the allocated resource does not belong to the selection window of CSI report, or the allocated resource doesn't have a frequency-adjacent pair to satisfy the certain condition described according to Embodiment 1.1. Then, the UE may select a resource for CSI report independent of the resource allocated to data transmission. Note that for this case, the resource selection for CSI report transmission will be restricted to the determined selection window.

According to another sub-embodiment, prioritization of resources is done for the selection of CSI-reports based on the above described criteria. For example, frequency adjacent resources are prioritized over frequency non-adjacent resources. In some cases, resources on same time slot are prioritized over resources in different time slots.

6.4 Embodiment 1.4

In some cases, resource selection for CSI report transmission is performed given that the resource allocation of data transmission from the same UE has already been done and the allocated resource belongs to the selection window of CSI report. Then, when a certain condition is satisfied, the UE responsively operates to combine the transmissions of CSI report and data, i.e., select one resource to transmit both of them. Here the word 'combine' can be performed by different ways, e.g., jointly encoded, separately encoded, frequency division multiplexing (FDM), time division multiplexing (TDM), etc. Also, in addition to the above criteria, here the certain condition can further include, but not limited to, that the payload of SL CSI report is smaller than a pre-defined or (pre-)configured threshold, the payload of data is smaller than a pre-defined or (pre-)configured threshold, or the sum of the CSI report and data payloads is smaller than a pre-defined or (pre-)configured threshold. In this way, the problems of half-duplex, resource fragmentation, and inter-modulation distortion can be reduced.

According to a sub-embodiment, this combination of data and CSI report can be signaled in the SA associated to the data. For instance, a new SA format is defined which include information about the combination format of data and CSI reports (e.g. time/frequency multiplexing, combine or separate encoding and/or related modulation coding scheme (MCS) etc.)

6.5 Embodiment 1.5

In some cases, transmission of data is always prioritized over the transmission of CSI reports. For example, when subject to a limited number of available resources, a UE can responsively drop the CSI transmissions and just schedule the data. In some cases, CSI reports can be prioritized over data transmissions. For instance, if only CSI reports can be scheduled due to its smaller payload as compared to data transmissions. In some other cases, the prioritization criteria/rule is (pre-)configured by the higher layers.

Furthermore, in case of power limited UEs to transmit simultaneous data and CSI reports, power allocation is also done based on prioritization rules as described.

The corresponding operation to control 1304 transmission of the data and the CSI report and/or CSI-RS to use the at least one resource that is selected within the overlapping region of the CSI selection window and the data selection window, can include prioritizing transmission of the data over transmission of the CSI report and/or CSI-RS by transmitting the data and not transmitting the CSI report and/or CSI-RS responsive to determining that the overlapping region of the CSI selection window and the data selection window has insufficient resources to performing transmission of both the data and the CSI report and/or CSI-RS.

The corresponding operation to control transmission of the data and the CSI report and/or CSI-RS to use the at least one resource that is selected within the overlapping region of the CSI selection window and the data selection window, can include prioritizing transmission of the CSI report and/or CSI-RS over transmission of the data report by transmitting the CSI report and/or CSI-RS and not transmitting the data responsive to determining that the overlapping region of the CSI selection window and the data selection window has insufficient resources to transmit the data.

6.6 Embodiment 1.6

In case of CSI reports and data transmissions with different periodicity, the above described embodiments (e.g., Embodiments 1.1. to 1.5) can be performed only if the periodicities are integer multiple of each other (in term of number of slots). For instance, if data periodicity is 10 slots (i.e. 10 ms) and CSI-report periodicity is 5 slot (i.e. 5 ms). If periodicities are not integer multiple of each other, then the optimizations as mentioned above are not applied and data/CSI reports are scheduled independently.

In one embodiment, the operation to control 1304 transmission of the data and the CSI report and/or CSI-RS to use the at least one resource that is selected within the overlapping region of the CSI selection window and the data selection window is only performed if a periodicity of transmission of the data is an integer multiple of a periodicity of transmission of the CSI report and/or CSI-RS. In an alternative embodiment, the operation to control 1304 transmission of the data and the CSI report and/or CSI-RS to use the at least one resource that is selected within the overlapping region of the CSI selection window and the data selection window is only performed if a periodicity of transmission of the CSI report and/or CSI-RS is an integer number of a periodicity of transmission of the data

6.7 Embodiment 1.7

In some cases, there is SL CSI report alone transmission, i.e., no (potential) data transmission from the same UE. Then, the UE will operate according to the Mode 4 resource allocation mechanism also for SL CSI report, where the selection window of candidate resources is determined by the embodiments under Section 7, below. Note that the Mode 4 resource allocation mechanism can be the existing one in LTE or its enhanced version in NR.

Figure 8:
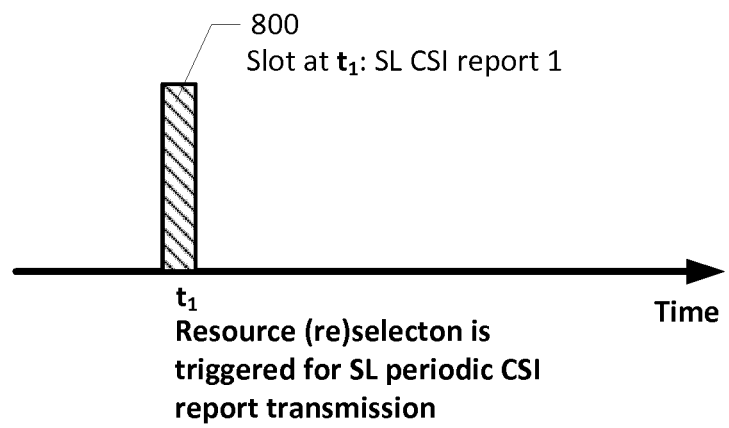
FIG. 8 illustrates a time graph and corresponding operations for resource (re)selection that is triggered for SL periodic CSI report, in accordance with some embodiments.

7. Embodiments Directed to Determining Candidate Slot(s) for Transmitting SL Periodic CSI Report As stated above, when resource (re)selection is triggered for SL CSI report, as illustrated in FIG. 8, a UE needs to first identify a valid selection window that contains the candidate resources. FIG. 8 illustrates a time graph and corresponding operations for resource 800 (re)selection that is triggered for SL periodic CSI report. In this section, we will describe how to determine the selection window for SL periodic CSI reports.

From time domain perspective, the time locations of the selection window that contains the candidate resources should take into account the following two aspects.

Figure 9:
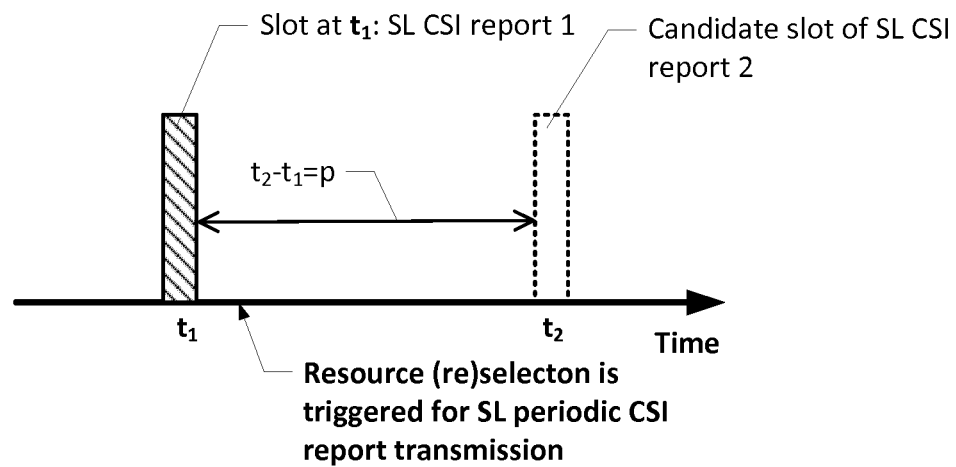
FIG. 9 illustrates a time graph and corresponding operations for a candidate slot when a strict periodicity is followed, in accordance with some embodiments.

1. The number of candidate resources. Denote the periodicity of SL CSI report as p. If a strictly periodic CSI report needs to be followed, the candidate slot for the next CSI report, i.e., SL CSI repot 2, will only contain the slots within $t_1+p$, as illustrated in FIG. 9. FIG. 9 illustrates a time graph and corresponding operations for a candidate slot when a strict periodicity. In this way, the too limited number of candidate resources will lead to a much higher probability of collisions. Moreover, when there is also potential data transmission from the same UE, the too limited number of candidate resources will make the issues of half-duplex constraint and resource fragmentation (as explained in Section 4) more severe, due to the lower probability of overlapped selection windows.

Figure 10:
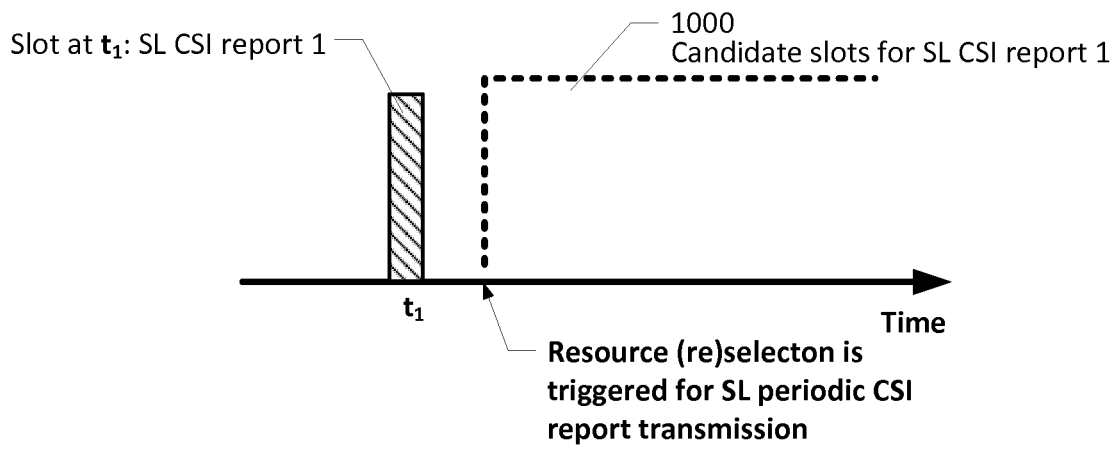
FIG. 10 illustrates a time graph and corresponding operations for candidate slots when there is not time limitation, in accordance with some embodiments.

2. The feature of periodic transmission. Another extreme case is that there is no time limitation on the candidate slots, as illustrated in FIG. 10. FIG. 10 illustrates a time graph and corresponding operations for candidate slots 1000 when there is not time limitation. In this case, it may happen that the selected slot at $t_2$ for SL CSI report 2 is either too close to CSI report 1 or too far away from it, i.e., $t_2-t_1$ is either too small or too large. This may degrade the efficiency and validity of the CSI report. Additionally, the feature of being periodic may be largely destroyed as well.

It is noted that the above described operational difficulties may only happen at the time of resource (re)selection for CSI-reports. In case of periodic transmissions, once the resource booking is done based on sensing results, the same resource allocation is followed until the resource reselection is triggered.

To handle the two aspects above, the invention proposes to (pre-)configure a window width w, together with periodicity, to indicate the selection window containing candidate slots for SL periodic CSI report, i.e., the allowed time variations when selecting resources for SL periodic CSI report. Two exemplary embodiments are described below.

7.1 Embodiment 2.1

Figure 11:
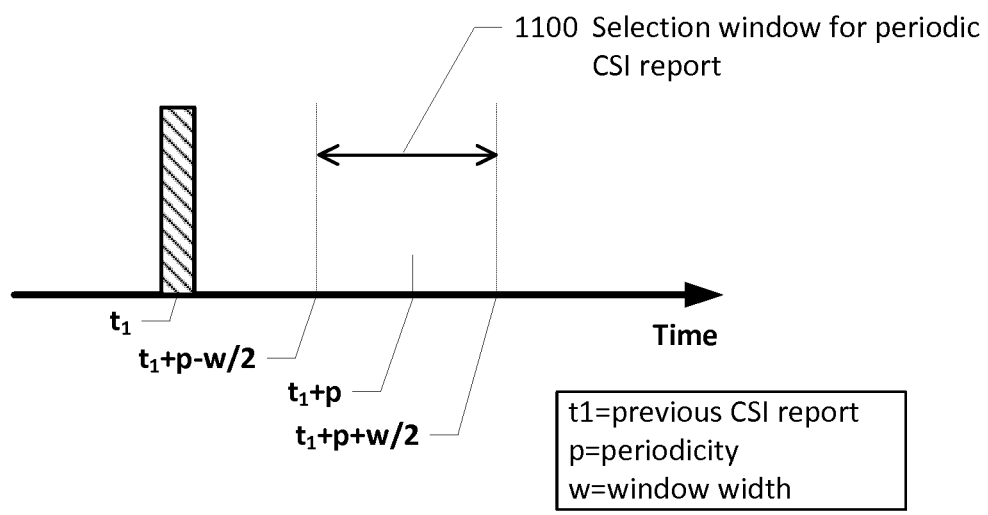
FIG. 11 illustrates a time graph and corresponding operations for a progressive manner to determine the candidate slots, in accordance with some embodiments.

In one embodiment, the time location of the selection window is determined based on a progressive manner, i.e., it depends on the time instance of the previous CSI report (e.g., $t_1$), the periodicity p, and the window width w. An example is illustrated in FIG. 11. FIG. 11 illustrates a time graph and corresponding operations for a progressive manner to determine the candidate slots within a selection window 1100.

The corresponding operation to identify 1300 the CSI selection window containing candidate resources for use in SL transmission of the CSI report and/or CSI-RS, can include determining a time location of the CSI selection window based on a time when another CSI report and/or CSI-RS was previously transmitted, periodicity of CSI reports and/or CSI-RS transmissions, and width of the CSI selection window.

Figure 17:
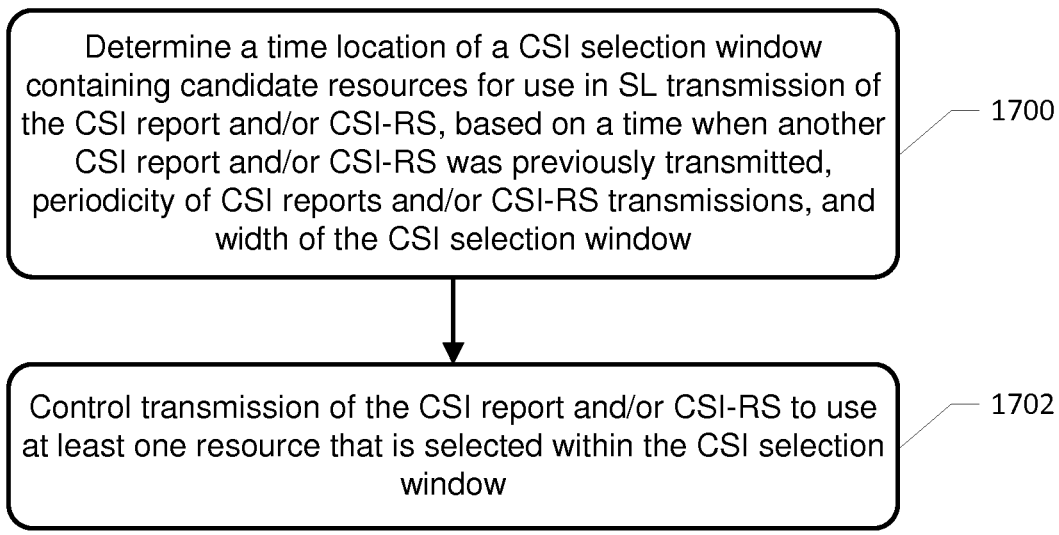

FIG. 17 illustrates corresponding operations that may be performed by a UE for SL transmission of a CSI report and/or a CSI-RS. Referring to FIG. 17, operations determine 1700 a time location of a CSI selection window containing candidate resources for use in SL transmission of the CSI report and/or CSI-RS, based on a time when another CSI report and/or CSI-RS was previously transmitted, periodicity of CSI reports and/or CSI-RS transmissions, and width of the CSI selection window. The operations control 1702 transmission of the CSI report and/or CSI-RS to use at least one resource that is selected within the CSI selection window.

7.2 Embodiment 2.2

Figure 12:
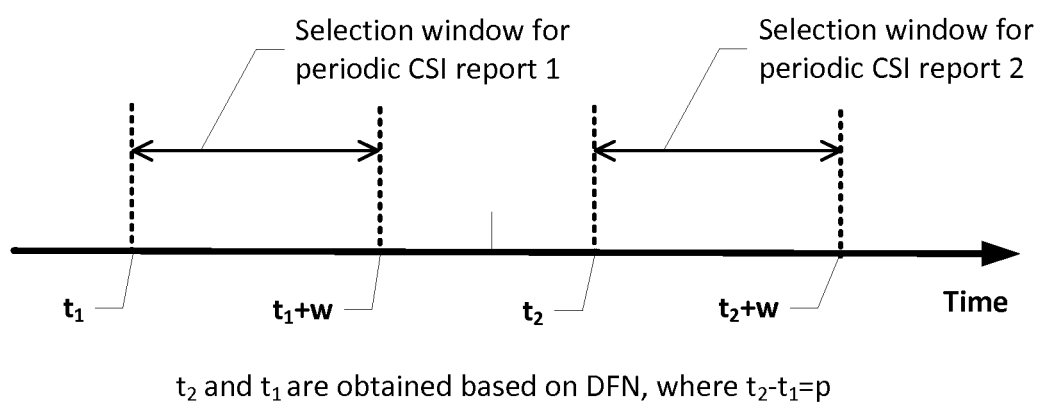
FIG. 12 illustrates a time graph and corresponding operations for a DFN-based manner to determine the candidate slots, in accordance with some embodiments.

In another embodiment, the time location of the selection window is determined according to a D2D frame number (DFN)-based manner. In this way, the time location depends on DFN, periodicity p, and the window width w. More specifically, the time locations of the selection windows follow a periodic manner with periodicity p. An example is illustrated in FIG. 12. FIG. 12 illustrates a time graph and corresponding operations for a DFN-based manner to determine the candidate slots. As shown in FIG. 12, the starting slot of the selection window for each periodic CSI report follows a periodic manner, i.e., $t_2-t_1=p$. On the other hand, the actual slots used for CSI report can be flexible and don't need to be strictly periodic, as long as they belong to the respective selection windows.

In some other examples, the selection window determined above includes certain slots that cannot be used for transmitting SL CSI report. Then, these slots will be excluded from the selection window correspondingly.

The corresponding operation to identify 1300 the CSI selection window containing candidate resources for use in SL transmission of the CSI report and/or CSI-RS, can include determining a time location of the CSI selection window based on a device to device, D2D, frame number, periodicity of CSI reports and/or CSI-RS transmissions, and width of the CSI selection window.

Figure 18:
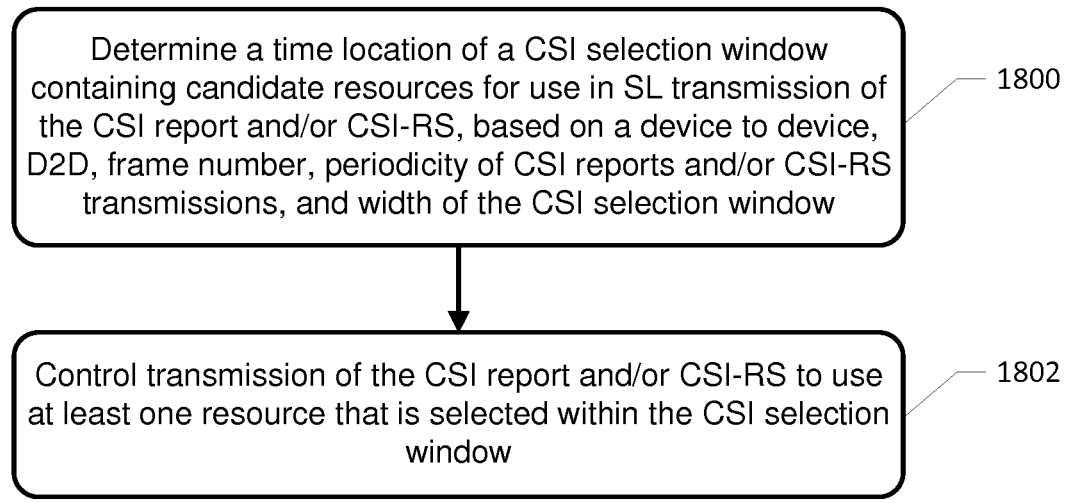

FIG. 18 illustrates corresponding operations that can be performed by a UE for SL transmission of a CSI report and/or a CSI-RS. Referring to FIG. 18, the operations determine 1800 a time location of a CSI selection window containing candidate resources for use in SL transmission of the CSI report and/or CSI-RS, based on a device to device, D2D, frame number, periodicity of CSI reports and/or CSI-RS transmissions, and width of the CSI selection window. The operations control 1802 transmission of the CSI report and/or CSI-RS to use at least one resource that is selected within the CSI selection window.

8. Embodiments Directed to Determining the Window Width for SL Periodic CSI Report In this section, an explanation is provided for how to select the window width w for SL periodic CSI report.

In some cases, the window width w may depend on the periodicity, e.g., the width is proportional to the periodicity such as w=0.4p i.e. 40% of periodicity.

In some cases, the window width w may depend on some measurement of the channel, e.g., channel busy ratio (CBR) measurement or its variant. For example, if CBR is high, a larger window width w is used to include more candidate resources that are less congested.

In some cases, the window width w is dependent on the CSI-RS which is used to generate the CSI reports. For example, the window width is chosen such that CSI-report remains valid within that time.

A corresponding operation by the UE can include determining width of the CSI selection window based on a proportional relationship to periodicity of CSI transmissions.

Alternatively, the operation by the UE can include determining width of the CSI selection window based on measurements of a channel to be used for transmission of the CSI report and/or CSI-RS.

The operation to determine the width of the CSI selection window based on measurements of the channel to be used for transmission of the CSI report and/or CSI-RS, can include determining the width of the CSI selection window based on a proportional relationship to a channel busy ratio, CBR, measurement of the channel.

Alternatively, the operation to determine the width of the CSI selection window based on measurements of the channel to be used for transmission of the CSI report and/or CSI-RS, can include determining the width of the CSI selection window dependent upon timing of the CSI-RS which is used to generate the CSI report.

9. Embodiments Directed to Signaling Aspects

From the network node (e.g. e/next generation nodeB (gNB)) operational perspective, the resource selection criteria as defined in Embodiment 1.1 is provided, e.g. via RRC or broadcast system information such as system information block (SIB). Furthermore, the network node signals the window width to the UE or the criteria to choose the selection window width e.g. via RRC message or SIB.

From a UE operational perspective, the UE receives the information from the network node via RRC or broadcast system information like SIB. Furthermore, a UE may also notify the change in data transmission format using sidelink control information, e.g. SA indicating time/frequency multiplexing of data and CSI reports in case of combined transmission as described in above embodiments.

From a UE operational perspective, pre-configuration or specifications also allows the correct UE behavior for the transmission of data and/or CSI reports.

A further corresponding operation by the UE can include receiving from a network node, an indication of a width of the CSI selection window and/or an indication of a criteria to be used to determine the width of the CSI selection window.

The UE may operate to receive from a network node, an indication of a criteria to be used for selection of a CSI report and/or CSI-RS transmission resource and a data transmission resource within the overlapping region of the CSI selection window and the data selection window. The UE can then responsively select one of the following conditions based on the criteria:
  a) no scheduling assignment in the first and second resources is detected by the UE;
  b) a scheduling assignment in the first and second resources is detected by the UE but an associated reference signal received power and/or a received signal strength indication measurement is below a first threshold value;
  c) a scheduling assignment in one of the first and second resources is detected by the UE but the associated reference signal received power and/or the received signal strength indication measurement is below a second threshold value; and
  d) a number of available resources within the region of the CSI selection window and the data selection window is above a third threshold value.

In another embodiment, the UE can then responsively select one of the following conditions based on the criteria:
  a) no scheduling assignment for the first and second resources is detected by the UE;
  b) a scheduling assignment for one of the first and second resources is detected by the UE but an associated reference signal received power and/or a received signal strength indication measurement is below a first threshold value;
  c) a scheduling assignment for one of the first and second resources is detected by the UE but the associated reference signal received power and/or the received signal strength indication measurement is below a second threshold value; and
  d) a number of available resources within the region of the CSI selection window and the data selection window is above a third threshold value.

The UE can then select the CSI report and/or CSI-RS transmission resource and the data transmission resource to be frequency adjacent and in a same slot to each other responsive to determining that the selected one of the conditions is satisfied.

The UE may receive the indication of the criteria through radio resource control, RRC, signaling and/or system information block, SIB, signaling. Alternatively or additionally the indication of the criteria may be pre-configured in memory of the UE.

Figure 19:
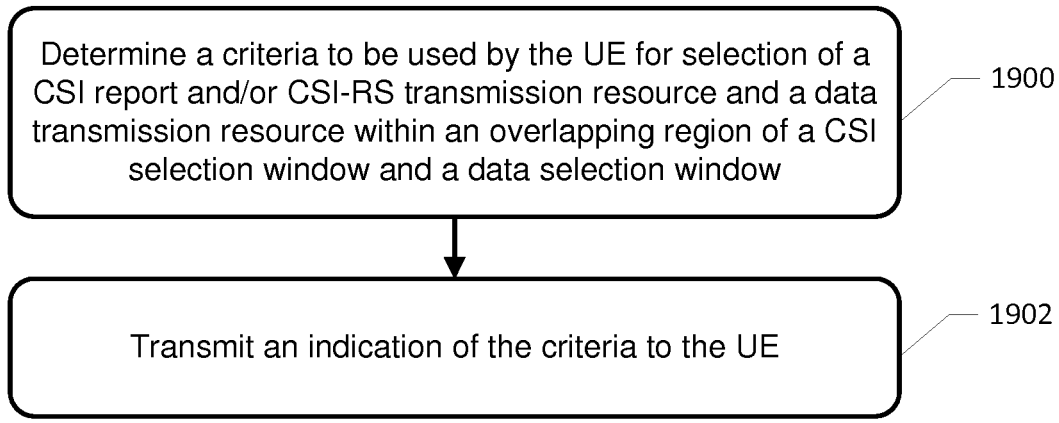
FIG. 19 is a flowchart of operations performed by network node for controlling SL transmission by a UE of a CSI report and/or a CSI-RS in accordance with some embodiments.

FIG. 19 illustrates corresponding operations that may be performed by a network node to control SL transmission by a UE of a CSI report and/or a CSI-RS. Referring to FIG. 19, the operations determine 1900 a criteria to be used by the UE for selection of a CSI report and/or CSI-RS transmission resource and a data transmission resource within an overlapping region of a CSI selection window and a data selection window. The operations transmit 1902 an indication of the criteria to the UE.

The indication of the criteria may be transmitted to the UE using radio resource control (RRC) signaling and/or system information block (SIB) signaling.

10. Embodiments Directed to Other Transmissions

Various embodiments above have been described in the context of SL CSI report but they can also be advantageously applied to other types of SL transmissions. Various non-limiting examples of such extensions include the following.

Embodiments under Section 6 can be applied to resource selection for SL CSI-RS transmissions.

Embodiments under Section 7 can be applied to determining candidate slots for transmitting SL periodic CSI-RS.

Embodiments under Section 8 and Section 9 can be applied to determining the window width for transmitting SL periodic CSI-RS.

Embodiments under Section 6 can be applied to resource selection for two streams of transmissions from the same UE. More specifically, instead of selecting resources for SL CSI report+SL data transmission, the similar operations and methods can be used to select resources for SL data A transmission+SL data B transmission, SL control information transmission+SL data transmission, etc.

Figure 16:
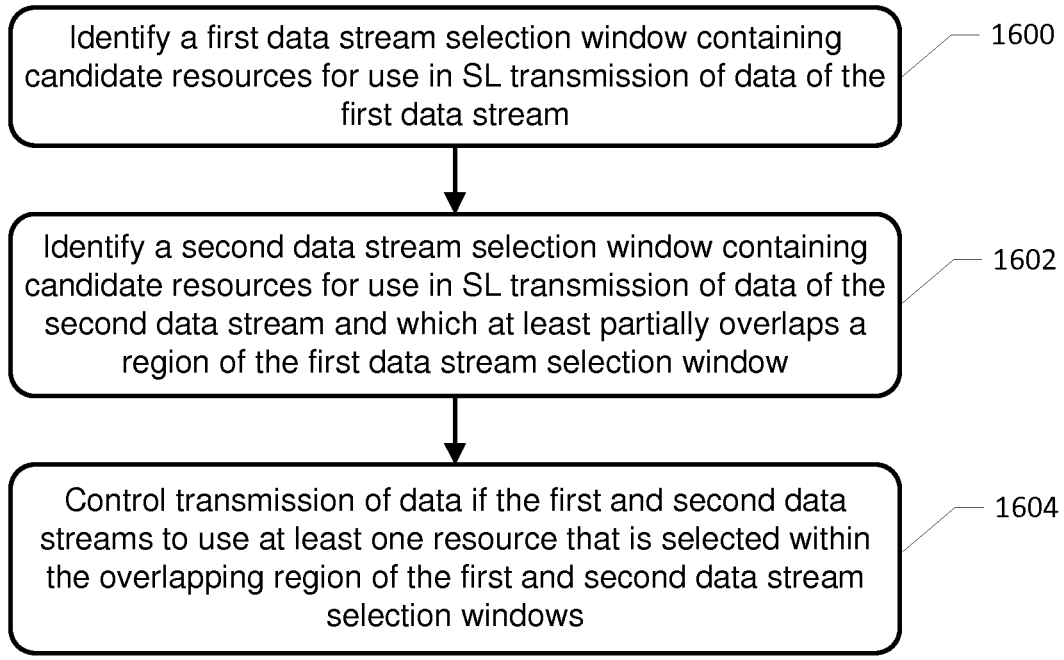

FIG. 16 illustrates corresponding operations that can be performed by a UE for data transmissions. Referring to FIG. 16, the operations identify 1600 a first data stream selection window containing candidate resources for use in SL transmission of data of the first data stream. The operations identify 1602 a second data stream selection window containing candidate resources for use in SL transmission of data of the second data stream and which at least partially overlaps a region of the first data stream selection window. The operation to control 1604 transmission of data if the first and second data streams to use at least one resource that is selected within the overlapping region of the first and second data stream selection windows.

Example UE and Network Node

Figure 20:
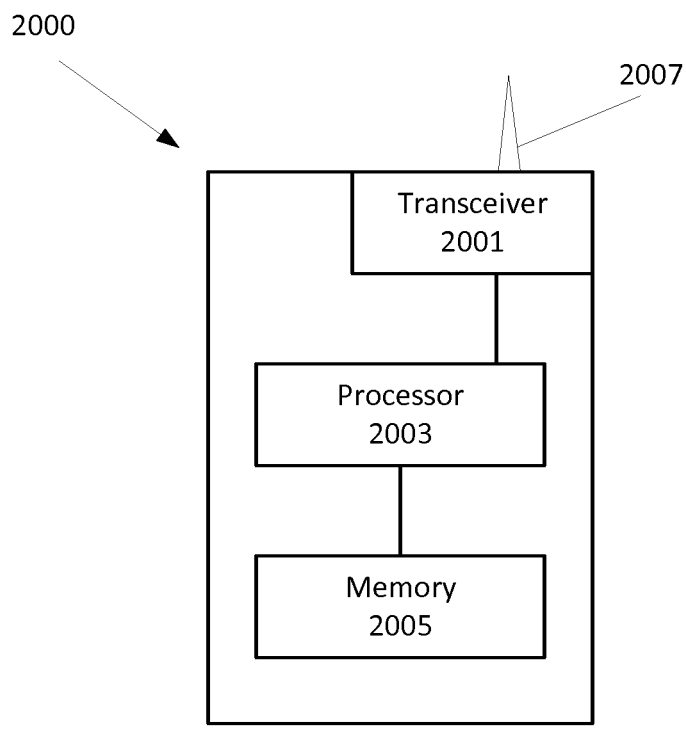
FIG. 20 is a block diagram illustrating a UE having components configured according to some embodiments.

FIG. 20 is a block diagram illustrating a UE 2000 having components configured according to some embodiments. The UE 2000 can include, without limitation, a wireless terminal, a wireless communication device, a wireless communication terminal, user equipment, UE, a user equipment node/terminal/device, etc. The UE 2000 is configured to provide wireless communications according to embodiments of the present inventive concepts. As shown, the UE 2000 can include an antenna 2007, a transceiver circuit 2001 (also referred to as a transceiver) including a transmitter and a receiver configured to provide uplink and downlink radio communications with other UEs (e.g., SL communications) and a radio access network (RAN) node (e.g., a base station, evolved NodeB (eNB), gNB, network node, etc.) of a wireless communication network. UE 2000 further includes a processor circuit 2003 (also referred to as a processor) coupled to the transceiver circuit 2001, and a memory circuit 2005 (also referred to as memory) coupled to the processor circuit 2003. The memory circuit 2005 stores computer readable program code that when executed by the processor circuit 2003 causes the processor circuit 2003 to perform operations according to embodiments disclosed herein. According to other embodiments, processor circuit 2003 may be defined to include memory so that a separate memory circuit is not required. UE 2000 may also include an interface (such as a user interface) coupled with processor 2003, and/or UE may be an Internet of Things (IoT) and/or machine type communication (MTC) device.

As discussed herein, operations of UE 2000 may be performed by processor 2003 and/or transceiver 2001. For example, processor 2003 may control transceiver 2001 to transmit uplink communications through transceiver 2001 over a radio interface to another UE and/or a RAN node of a wireless communication network and/or to receive downlink communications through transceiver 2001 from another UE and/or a RAN node of the wireless communication network over a radio interface. Moreover, modules may be stored in memory 2005, and these modules may provide instructions so that when instructions of a module are executed by processor 2003, processor 2003 performs respective operations (e.g., operations discussed below with respect to Example Embodiments).

Figure 21:
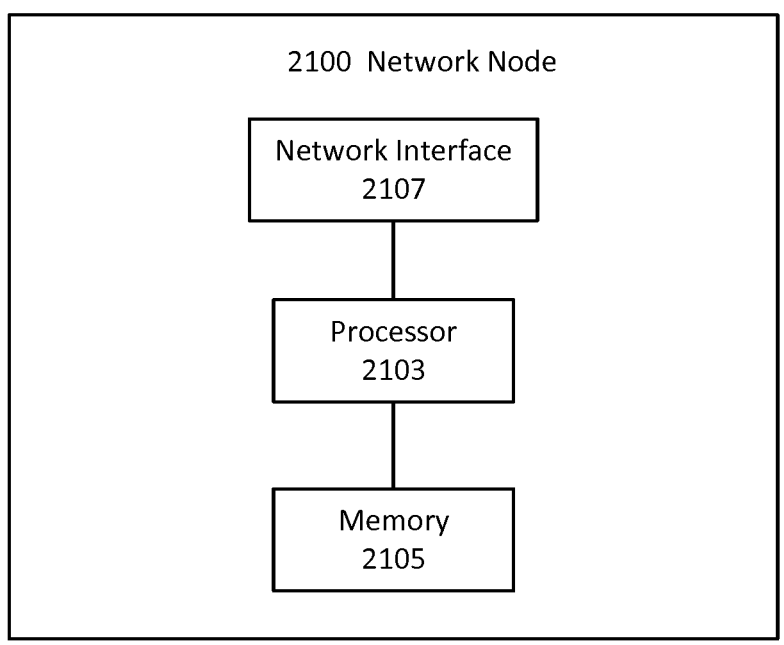
FIG. 21 is a block diagram illustrating a network node having components configured according to some embodiments.

FIG. 21 is a block diagram illustrating a network node 2100 having components configured according to some embodiments. The network node 2100 can include, without limitation, a base station, eNB, gNB, etc. The network node 2100 is configured to provide wireless communications according to embodiments of the present inventive concepts. As shown, the network node 2100 includes a network interface 2107, a processor circuit 2103 (also referred to as a processor) coupled to the network interface 2107, and a memory circuit 2105 (also referred to as memory) coupled to the processor circuit 2103. The memory circuit 2105 stores computer readable program code that when executed by the processor circuit 2103 causes the processor circuit 2103 to perform operations according to embodiments disclosed herein. According to other embodiments, processor circuit 2103 may be defined to include memory so that a separate memory circuit is not required.

LISTING OF EMBODIMENTS

1. A method of operating a user equipment, UE, for device-to-device, D2D, transmission of a channel state information, CSI, report and/or a CSI reference signal, CSI-RS, the method comprising:
   identifying (1300) a CSI selection window containing candidate resources for use in D2D transmission of the CSI report and/or CSI-RS;
   identifying (1302) a data selection window containing candidate resources for use in D2D transmission of data and which at least partially overlaps a region of the CSI selection window; and
   controlling (1304) transmission of data and the CSI report and/or CSI-RS to use at least one resource that is selected within the overlapping region of the CSI selection window and the data selection window.

2. The method of Embodiment 1, wherein the identification of the data selection window is further performed to satisfy a deadline for transmission of the CSI report and/or CSI-RS and/or responsive to a defined UE operational capability.

3. The method of any of Embodiments 1 to 2, wherein the transmission of the CSI report and/or CSI-RS comprises transmission of a CSI report without transmission of CSI-RS.

4. The method of any of Embodiments 1 to 2, wherein the transmission of the CSI report and/or CSI-RS comprises transmission of a CSI-RS without transmission of a CSI report.

5. The method of any of Embodiments 1 to 4, wherein the controlling (1304) transmission of the data and the CSI report and/or CSI-RS to use the at least one resource that is selected within the overlapping region of the CSI selection window and the data selection window, comprises:
   selecting (1400) a first resource for transmission of the data within the overlapping region of the CSI selection window and the data selection window;
   selecting (1402) a second resource for transmission of the CSI report and/or CSI-RS within the overlapping region of the CSI selection window and the data selection window;
   initiating (1404) transmission of data using the first resource; and
   initiating (1406) transmission of the CSI report and/or CSI-RS using the second resource.

6. The method of Embodiment 5, wherein:
   the selection of one of the first and second resources is performed responsive to the selection of the other one of the first and second resources; or
   the selection of the one of the first and second resources is performed independently of the selection of the other one of the first and second resources.

7. The method of any of Embodiments 5 to 6, wherein:
   the selection of the first and second resources is controlled so they are frequency adjacent and in a same slot to each other.

8. The method of Embodiment 7, wherein:
   the selection of the first and second resources to be frequency adjacent and in a same slot to each other is performed responsive to determining that any one or more of the following conditions is satisfied:
   a) no scheduling assignment in the first and second resources is detected by the UE;
   b) a scheduling assignment in the first and second resources is detected by the UE but an associated reference signal received power and/or a received signal strength indication measurement is below a first threshold value;
   c) a scheduling assignment in one of the first and second resources is detected by the UE but the associated reference signal received power and/or the received signal strength indication measurement is below a second threshold value; and
   d) a number of available resources within the region of the CSI selection window and the data selection window is above a third threshold value.

9. The method of Embodiment 7, wherein:
   the selection of the first and second resources to be frequency adjacent and in a same slot to each other is performed responsive to determining that any one or more of the following conditions is satisfied:
   a) no scheduling assignment for the first and second resources is detected by the UE;
   b) a scheduling assignment for one of the first and second resources is detected by the UE but an associated reference signal received power and/or a received signal strength indication measurement is below a first threshold value;
   c) a scheduling assignment for one of the first and second resources is detected by the UE but the associated reference signal received power and/or the received signal strength indication measurement is below a second threshold value; and
   d) a number of available resources within the region of the CSI selection window and the data selection window is above a third threshold value.

10. The method of any of Embodiments 5 to 6, wherein:
    the selection of the first and second resources is controlled so they are frequency nonadjacent and in a same slot to each other.

11. The method of any of Embodiments 1 to 4, wherein the controlling (1304) transmission of the data and the CSI report and/or CSI-RS to use the at least one resource that is selected within the overlapping region of the CSI selection window and the data selection window, comprises:
    combining (1500) the data and the CSI report and/or CSI-RS into a combined payload;
    selecting (1502) a resource within the overlapping portion of the selection window and the data selection window; and
    initiating (1504) transmission of the combined payload report using the resource selected.

12. The method of Embodiment 11, wherein the operation to combine (1500) the data and the CSI report and/or CSI-RS into a combined payload, comprises:

generating the combined payload by any one or more of: 1) jointly encoding the data and the CSI report and/or CSI-RS; 2) separately encoding the data from the CSI report and/or CSI-RS and then combining the encoded data and the encoded CSI report and/or CSI-RS; 3) performing frequency division multiplexing of the data and the CSI report and/or CSI-RS to provide transmission of the combined payload report; and 4) performing time division multiplexing of the data and the CSI report and/or CSI-RS to provide transmission of the combined payload report.

13. The method of Embodiment 11, further comprising:

signalling an indication of the combined payload in a scheduling assignment associated with the data.

14. The method of any of Embodiments 11 to 13, wherein the controlling (1304) transmission of the data and the CSI report and/or CSI-RS to use the at least one resource that is selected within the overlapping region of the CSI selection window and the data selection window, further comprises:

determining whether a condition is satisfied because at least one of the payload and the data is smaller than a defined threshold, and wherein the combining of the data and the CSI report and/or CSI-RS into the combined payload is performed in response to determining that the condition is satisfied.

15. The method of any of Embodiments 1 to 14, wherein the controlling (1304) transmission of the data and the CSI report and/or CSI-RS to use the at least one resource that is selected within the overlapping region of the CSI selection window and the data selection window, comprises:

prioritizing transmission of the data over transmission of the CSI report and/or CSI-RS by transmitting the data and not transmitting the CSI report and/or CSI-RS responsive to determining that the overlapping region of the CSI selection window and the data selection window has insufficient resources to performing transmission of both the data and the CSI report and/or CSI-RS.

16. The method of any of Embodiments 1 to 15, wherein the controlling transmission of the data and the CSI report and/or CSI-RS to use the at least one resource that is selected within the overlapping region of the CSI selection window and the data selection window, comprises:

prioritizing transmission of the CSI report and/or CSI-RS over transmission of the data report by transmitting the CSI report and/or CSI-RS and not transmitting the data responsive to determining that the overlapping region of the CSI selection window and the data selection window has insufficient resources to transmit the data.

17. The method of any of Embodiments 1 to 16, wherein the controlling (1304) transmission of the data and the CSI report and/or CSI-RS to use the at least one resource that is selected within the overlapping region of the CSI selection window and the data selection window, is only performed if a periodicity of transmission of the data is an integer multiple of a periodicity of transmission of the CSI report and/or CSI-RS.

18. The method of any of Embodiments 1 to 17, wherein the identification (1300) of the CSI selection window containing candidate resources for use in D2D transmission of the CSI report and/or CSI-RS, comprises:

determination a time location of the CSI selection window based on a time when another CSI report and/or CSI-RS was previously transmitted, periodicity of CSI reports and/or CSI-RS transmissions, and width of the CSI selection window.

19. The method of any of Embodiments 1 to 18, wherein the identification (1300) of the CSI selection window containing candidate resources for use in D2D transmission of the CSI report and/or CSI-RS, comprises:

determination a time location of the CSI selection window based on a D2D frame number, periodicity of CSI reports and/or CSI-RS transmissions, and width of the CSI selection window.

20. The method of any of Embodiments 1 to 19, further comprising:

determining width of the CSI selection window based on a proportional relationship to periodicity of CSI transmissions.

21. The method of any of Embodiments 1 to 20, further comprising:

determining width of the CSI selection window based on measurements of a channel to be used for transmission of the CSI report and/or CSI-RS.

22. The method of Embodiment 21, wherein the determination of the width of the CSI selection window based on measurements of the channel to be used for transmission of the CSI report and/or CSI-RS, comprises:

determining the width of the CSI selection window based on a proportional relationship to a channel busy ratio, CBR, measurement of the channel.

23. The method of Embodiment 21, wherein the determination of the width of the CSI selection window based on measurements of the channel to be used for transmission of the CSI report and/or CSI-RS, comprises:

determining the width of the CSI selection window dependent upon timing of the CSI-RS which is used to generate the CSI report.

24. The method of any of Embodiments 1 to 23, further comprising:

receiving from a network node, an indication of a width of the CSI selection window and/or an indication of a criteria to be used to determine the width of the CSI selection window.

25. The method of any of Embodiments 1 to 24, further comprising:

receiving from a network node, an indication of a criteria to be used for selection of a CSI report and/or CSI-RS transmission resource and a data transmission resource within the overlapping region of the CSI selection window and the data selection window;

selecting one of the following conditions based on the criteria:
a) no scheduling assignment in the first and second resources is detected by the UE;
b) a scheduling assignment in the first and second resources is detected by the UE but an associated reference signal received power and/or a received signal strength indication measurement is below a first threshold value;
c) a scheduling assignment in one of the first and second resources is detected by the UE but the associated reference signal received power and/or the received signal strength indication measurement is below a second threshold value; and
d) a number of available resources within the region of the CSI selection window and the data selection window is above a third threshold value; and performing the selection of the CSI report and/or CSI-RS transmission resource and the data transmission resource to be frequency adjacent and in a same slot to each other responsive to determining that the selected one of the conditions is satisfied.

26. The method of any of Embodiments 1 to 24, further comprising:

receiving from a network node, an indication of a criteria to be used for selection of a CSI report and/or CSI-RS transmission resource and a data transmission resource within the overlapping region of the CSI selection window and the data selection window;

selecting one of the following conditions based on the criteria:
a) no scheduling assignment for the first and second resources is detected by the UE;
b) a scheduling assignment for one of the first and second resources is detected by the UE but an associated reference signal received power and/or a received signal strength indication measurement is below a first threshold value;
c) a scheduling assignment for one of the first and second resources is detected by the UE but the associated reference signal received power and/or the received signal strength indication measurement is below a second threshold value; and
d) a number of available resources within the region of the CSI selection window and the data selection window is above a third threshold value; and performing the selection of the CSI report and/or CSI-RS transmission resource and the data transmission resource to be frequency adjacent and in a same slot to each other responsive to determining that the selected one of the conditions is satisfied.

27. The method of any of Embodiments 25-26, wherein:
the indication of the criteria is received through radio resource control, RRC, signaling and/or system information block, SIB, signaling, and/or the indication of the criteria is pre-configured in memory of the UE.

28. A method of operating a user equipment, UE, for device-to-device, D2D, data transmissions, the method comprising:

identifying (1600) a first data stream selection window containing candidate resources for use in D2D transmission of data of the first data stream;

identifying (1602) a second data stream selection window containing candidate resources for use in D2D transmission of data of the second data stream and which at least partially overlaps a region of the first data stream selection window; and controlling (1604) transmission of data if the first and second data streams to use at least one resource that is selected within the overlapping region of the first and second data stream selection windows.

29. A method of operating a user equipment, UE, for device-to-device, D2D, transmission of a channel state information, CSI, report and/or a CSI reference signal, CSI-RS, the method comprising:

determining (1700) a time location of a CSI selection window containing candidate resources for use in D2D transmission of the CSI report and/or CSI-RS, based on a time when another CSI report and/or CSI-RS was previously transmitted, periodicity of CSI reports and/or CSI-RS transmissions, and width of the CSI selection window; and controlling (1702) transmission of the CSI report and/or CSI-RS to use at least one resource that is selected within the CSI selection window.

30. A method of operating a user equipment, UE, for device-to-device, D2D, transmission of a channel state information, CSI, report and/or a CSI reference signal, CSI-RS, the method comprising:

determining (1800) a time location of a CSI selection window containing candidate resources for use in D2D transmission of the CSI report and/or CSI-RS, based on a D2D frame number, periodicity of CSI reports and/or CSI-RS transmissions, and width of the CSI selection window; and controlling (1802) transmission of the CSI report and/or CSI-RS to use at least one resource that is selected within the CSI selection window.

31. A method of operating a network node (2100) to control device-to-device, D2D, transmission by a user equipment, UE, of a channel state information, CSI, report and/or a CSI reference signal, CSI-RS, the method comprising:

determining (1900) a criteria to be used by the UE for selection of a CSI report and/or CSI-RS transmission resource and a data transmission resource within an overlapping region of a CSI selection window and a data selection window;

transmitting (1902) an indication of the criteria to the UE.

32. The method of Embodiment 31, wherein the indication of the criteria is transmitted to the UE using radio resource control, RRC, signaling and/or system information block, SIB, signaling.

33. The method of any of Embodiments 1 to 32, wherein the D2D transmission comprises sidelink, SL, transmission.

34. A user equipment, UE, (2000) adapted to perform according to any of Embodiments 1 to 28 or according to Embodiment 31.

35. A user equipment, UE, (2000) comprising:
transceiver;
a processor coupled to the transceiver; and
memory coupled with the processor, wherein the memory stores instructions that when executed by the processor causes the UE to perform operations according to any of Embodiments 1 to 29 or according to Embodiment 31.

36. A network node (2100) adapted to perform according to any of Embodiment 31 to 32.

37. A network node (2100) comprising:
transceiver;
a processor coupled to the transceiver; and
memory coupled with the processor, wherein the memory stores instructions that when executed by the processor causes the network node to perform operations according to any of Embodiments 31 to 32.

38. A computer program product, comprising:
A non-transitory computer readable storage medium comprising computer readable program code embodied in the medium that when executed by a processor (2003) of a user equipment, UE, (2000) causes the UE to perform operations according to any of Embodiments 1 to 31 or according to Embodiment 33.

39. A computer program comprising program code to be executed by at least one processor (2003) of a user equipment, UE, (2000) whereby execution of the program code causes the UE to perform operations according to any of Embodiments 1 to 31 or according to Embodiment 33.

40. A computer program product, comprising:
a non-transitory computer readable storage medium comprising computer readable program code embodied in the medium that when executed by a processor (2103) of a network node (2100) causes the network node to perform operations according to any of Embodiments 31 to 33.

A computer program comprising program code to be executed by at least one processor (2103) of a network node (2100) whereby execution of the program code causes the network node to perform operations according to any of Embodiments 31 to 33.

Explanations for abbreviations from the above disclosure are provided below:

| Abbreviation | Explanation |
| --- | --- |
| CBR | Channel busy ratio |
| CSI | Channel state information |
| CSI-RS | Channel state information reference signal |
| D2D | Device to device |
| DCI | Downlink control channel |
| DFN | D2D frame number |
| NW | Network |
| ProSe | Proximity services |
| PSCCH | Physical sidelink control channel |
| PSSCH | Physical sidelink shared channel |
| PPPP | ProSe per packet priority |
| QoS | Quality of service |
| RS | Reference signal |
| RRC | Radio resource control |
| RSRP | Reference signal received power |
| RSSI | Received signal strength indication |
| SA | Scheduling assignment |
| SIB | System information block |
| SL | Sidelink |
| UE | User equipment |
| V2I | Vehicle-to-infrastructure |
| V2N | Vehicle-to-network |
| V2V | Vehicle-to-vehicle |
| V2P | Vehicle-to-pedestrian |
| V2X | Vehicle-to-anything communication |

Further definitions and embodiments are discussed below:

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 22:
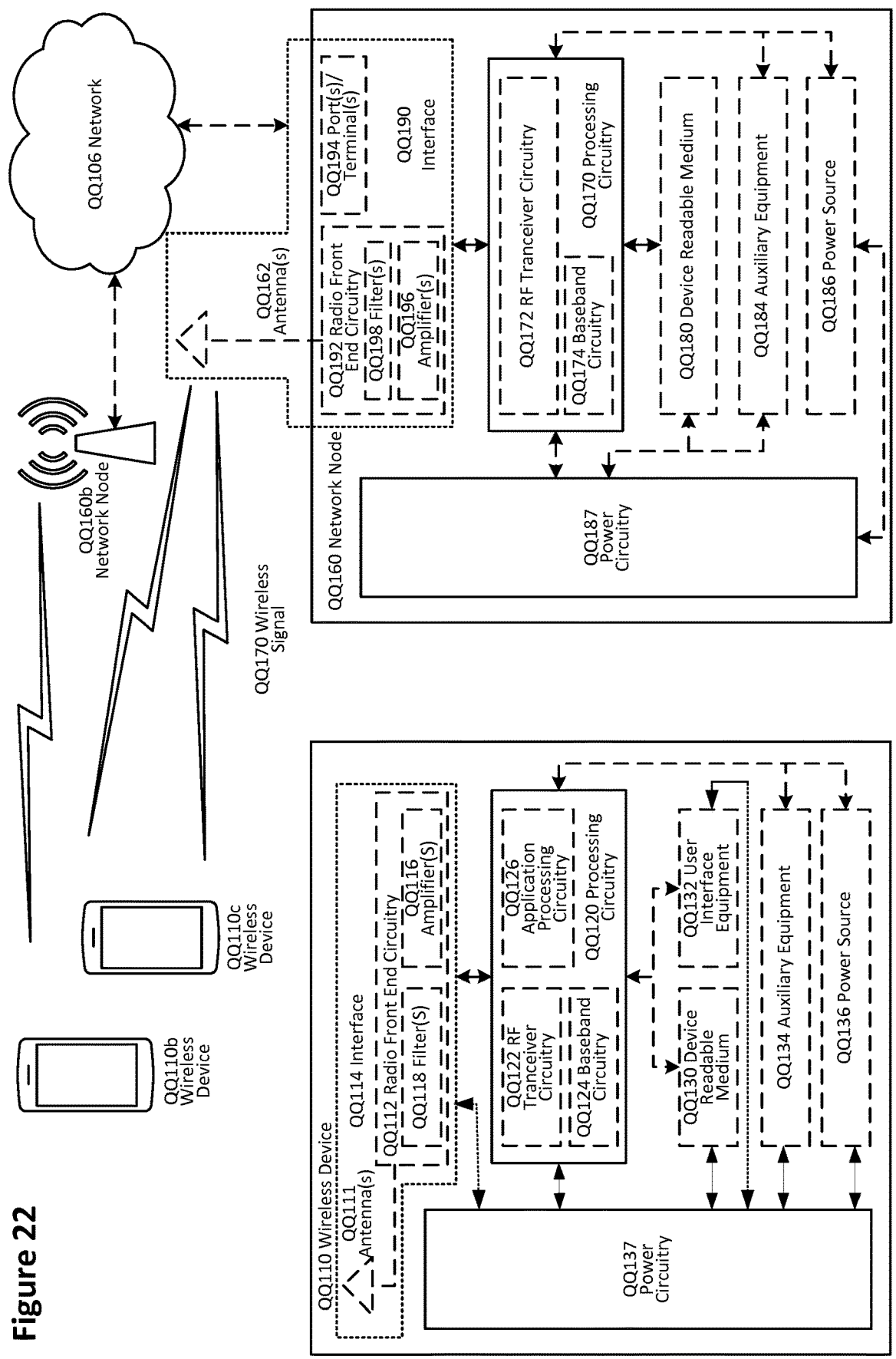
FIG. 22 is a block diagram of a wireless network in accordance with some embodiments.

FIG. 22: A wireless network in accordance with some embodiments.

Although the subject matter described herein may be implemented in any appropriate type of system using any suitable components, the embodiments disclosed herein are described in relation to a wireless network, such as the example wireless network illustrated in FIG. 22. For simplicity, the wireless network of FIG. 22 only depicts network QQ106, network nodes QQ160 and QQ160b, and WDs QQ110, QQ110b, and QQ110c (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 22, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 22 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units.

In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 22 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated. User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 23:
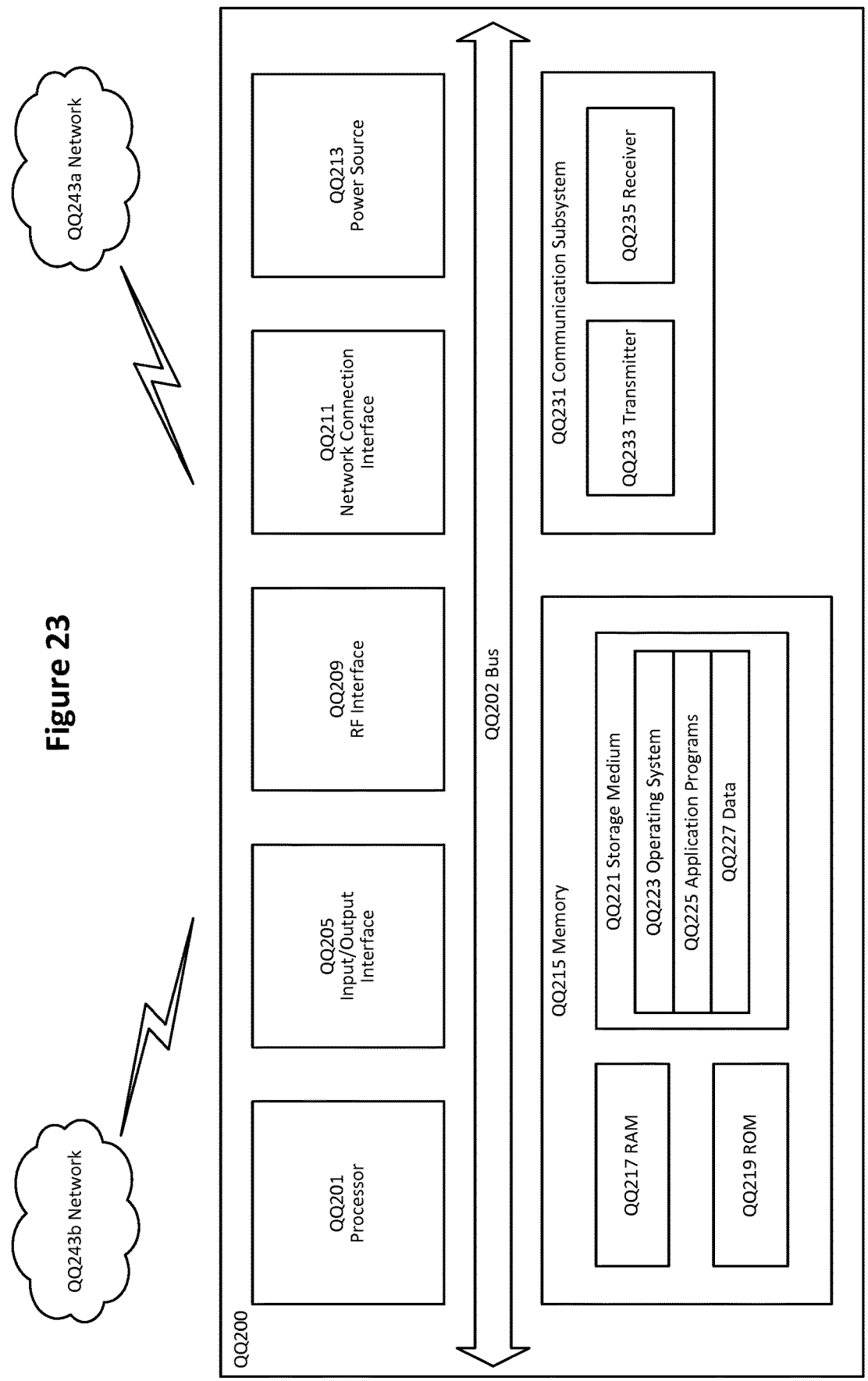
FIG. 23 is a block diagram of a user equipment in accordance with some embodiments.

FIG. 23: User Equipment in accordance with some embodiments

FIG. 23 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the 3rd Generation Partnership Project (3GPP), including a NB-IoT UE, a machine type communication (MTC) UE, and/or an enhanced MTC (eMTC) UE. UE QQ200, as illustrated in FIG. 23, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 23 is a UE, the components discussed herein are equally applicable to a WD, and vice-versa.

In FIG. 23, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 23, or only a subset of the components. The level of integration between the components may vary from one UE to another UE. Further, certain UEs may contain multiple instances of a component, such as multiple processors, memories, transceivers, transmitters, receivers, etc.

In FIG. 23, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.);

programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 23, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a local-area network (LAN), a wide-area network (WAN), a computer network, a wireless network, a telecommunications network, another like network or any combination thereof. For example, network QQ243a may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 23, processing circuitry QQ201 may be configured to communicate with network QQ243b using communication subsystem QQ231. Network QQ243a and network QQ243b may be the same network or networks or different network or networks. Communication subsystem QQ231 may be configured to include one or more transceivers used to communicate with network QQ243b. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243b may encompass wired and/or wireless networks such as a local-area network (LAN), a wide-area network (WAN), a computer network, a wireless network, a telecommunications network, another like network or any combination thereof. For example, network QQ243b may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 24:
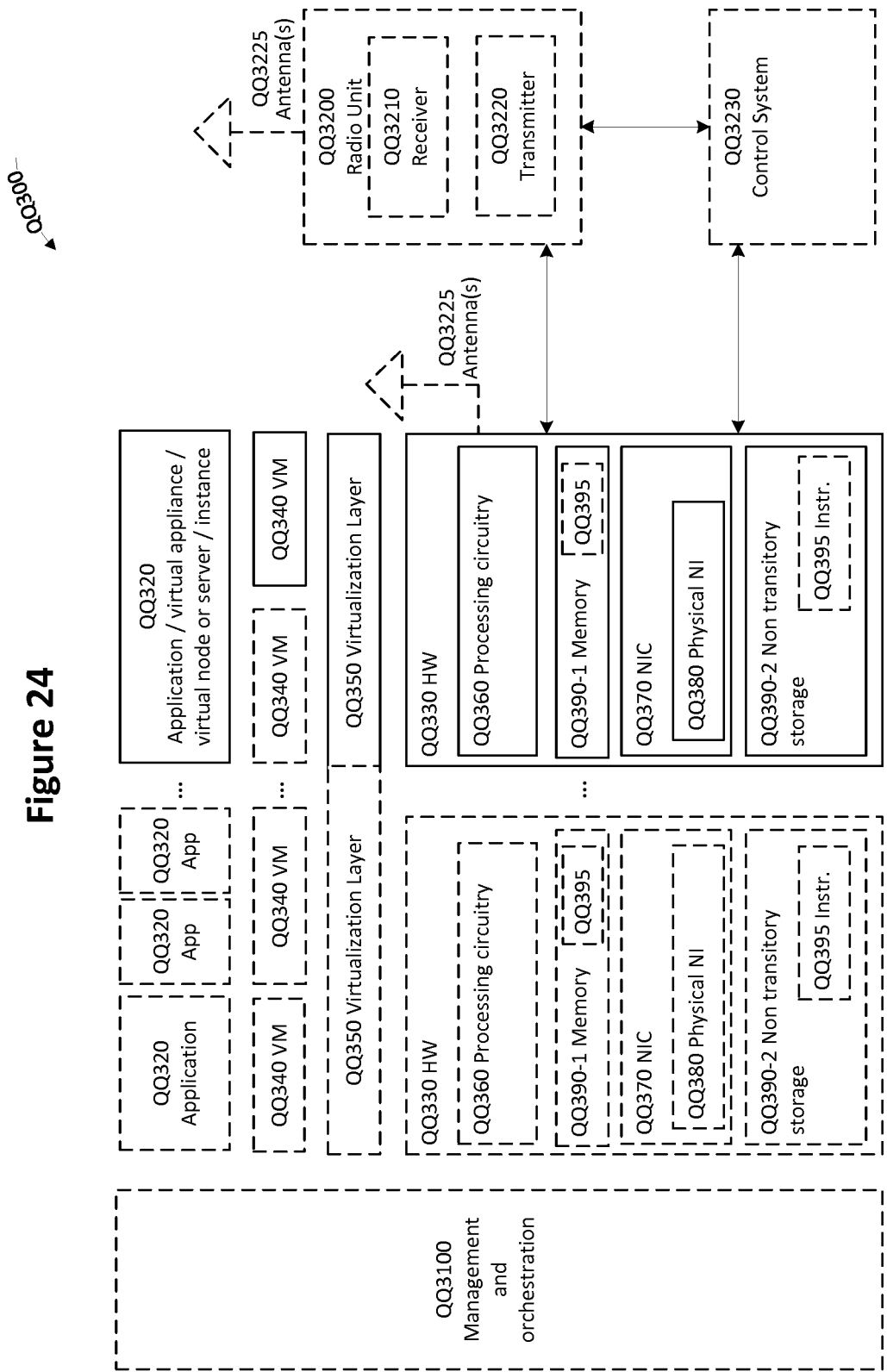
FIG. 24 is a block diagram of a virtualization environment in accordance with some embodiments.

FIG. 24: Virtualization environment in accordance with some embodiments

FIG. 24 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 24, hardware QQ330 may be a standalone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 24.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signalling can be effected with the use of control system QQ3230 which may alternatively be used for communication between the hardware nodes QQ330 and radio units QQ3200.

Figure 25:
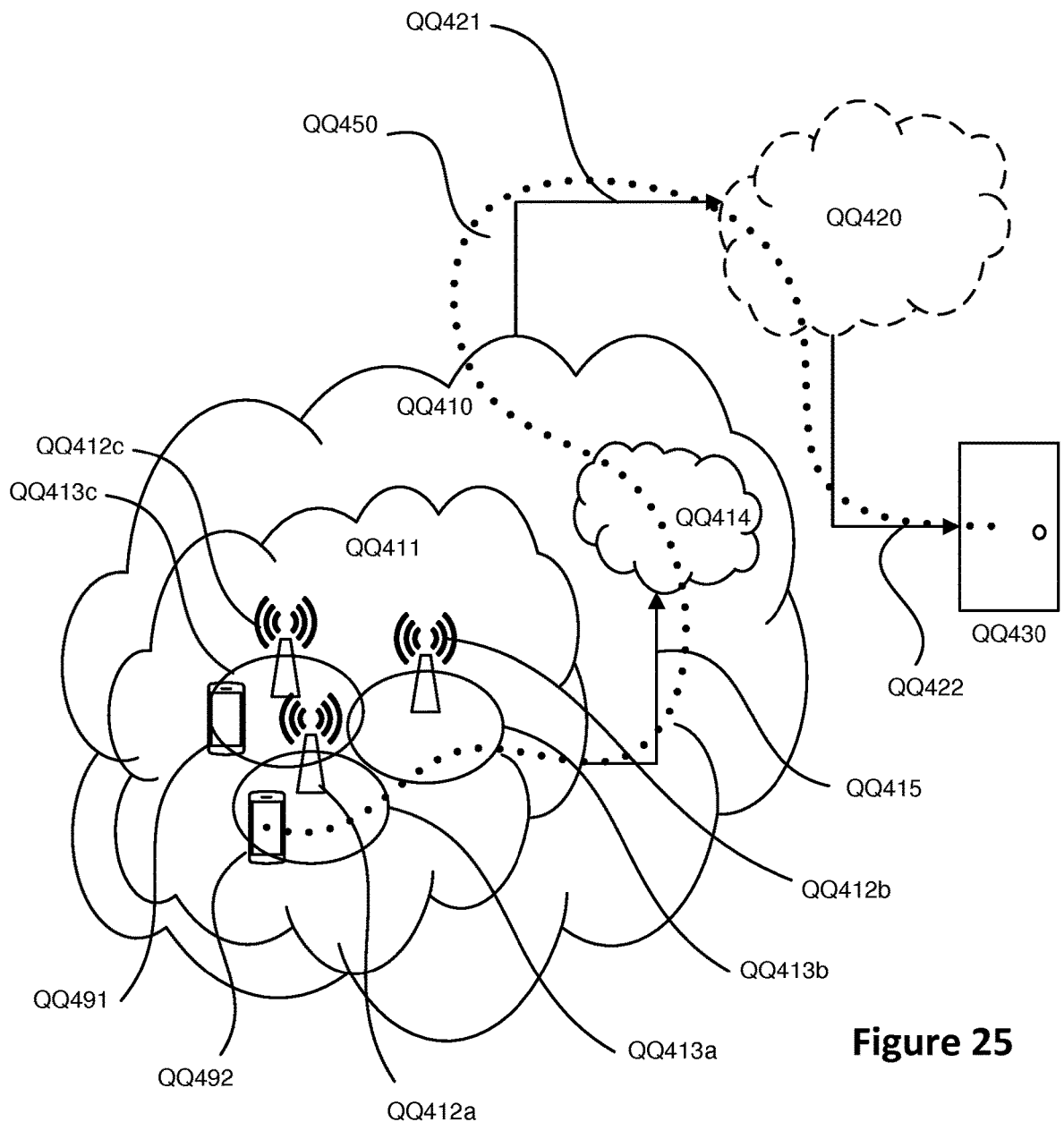
FIG. 25 is a block diagram of a telecommunication network connected via an intermediate network to a host computer in accordance with some embodiments.

FIG. 25: Telecommunication network connected via an intermediate network to a host computer in accordance with some embodiments.

With reference to FIG. 25, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 25 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Figure 26:
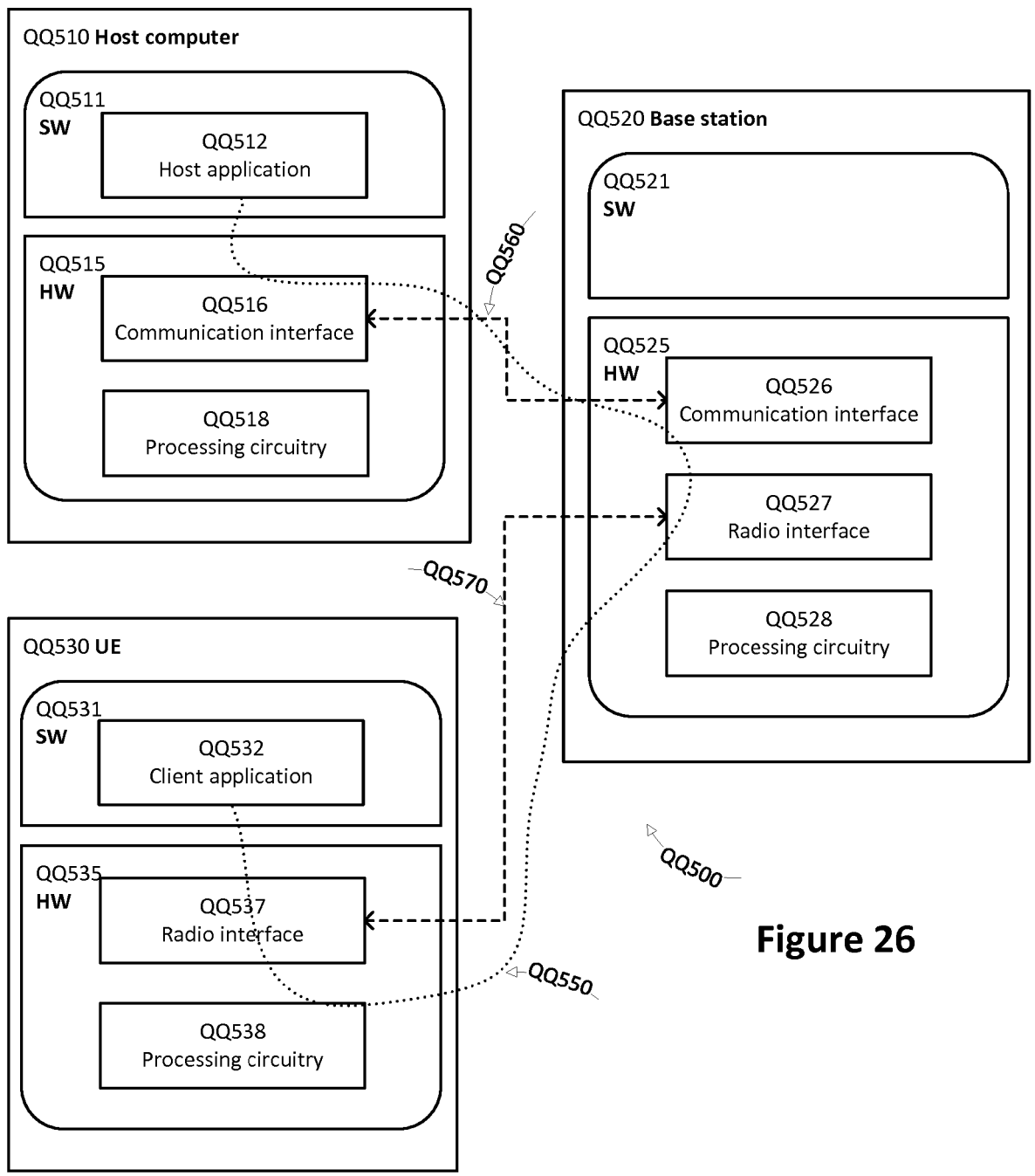
FIG. 26 is a block diagram of a host computer communicating via a base station with a user equipment over a partially wireless connection in accordance with some embodiments.

FIG. 26: Host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 26. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 26) served by base station QQ520. Communication interface QQ526 may be configured to facilitate connection QQ560 to host computer QQ510. Connection QQ560 may be direct or it may pass through a core network (not shown in FIG. 26) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

It is noted that host computer QQ510, base station QQ520 and UE QQ530 illustrated in FIG. 26 may be similar or identical to host computer QQ430, one of base stations QQ412a, QQ412b, QQ412c and one of UEs QQ491, QQ492 of FIG. 26, respectively. This is to say, the inner workings of these entities may be as shown in FIG. 26 and independently, the surrounding network topology may be that of FIG. 25.

In FIG. 26, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments may improve the performance of OTT services provided to UE QQ530 using OTT connection QQ550, in which wireless connection QQ570 forms the last segment. More precisely, the teachings of these embodiments may improve the deblock filtering for video processing and thereby provide benefits such as improved video encoding and/or decoding.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 27:
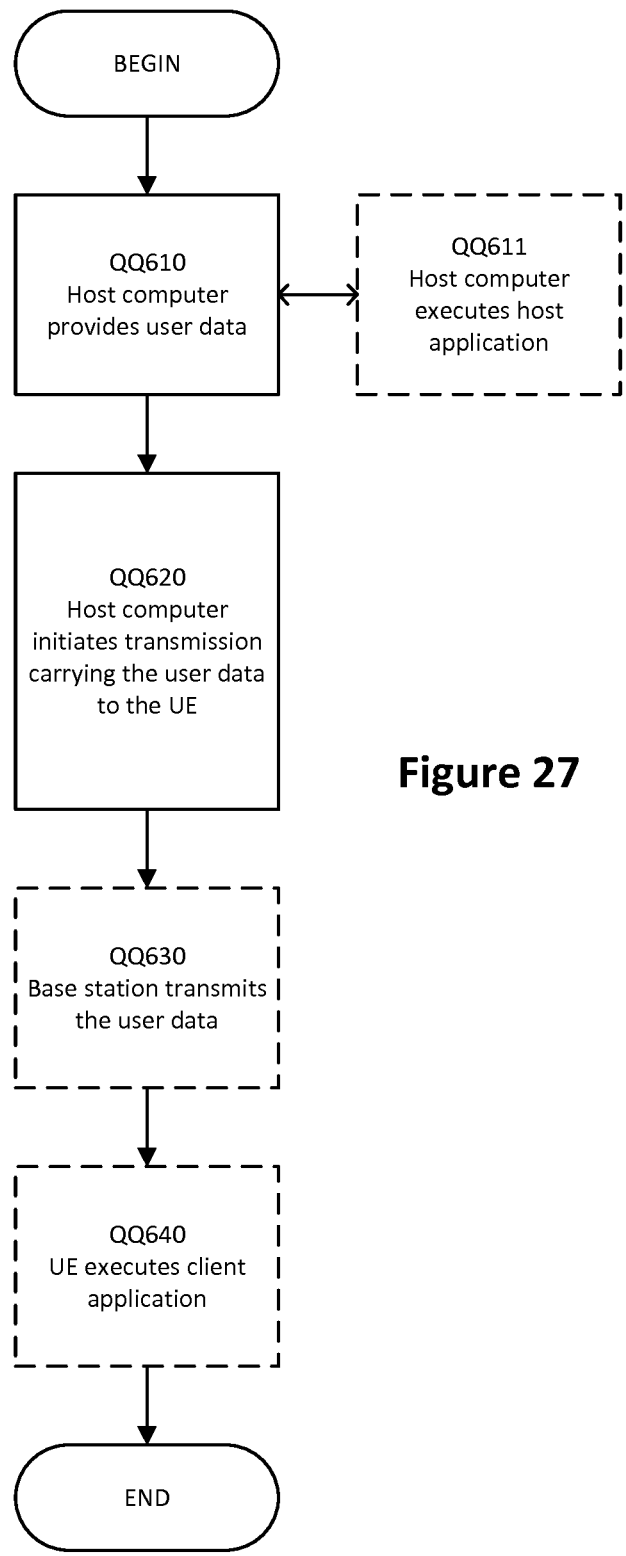
FIG. 27 is a block diagram of methods implemented in a communication system including a host computer, a base station and a user equipment in accordance with some embodiments.

FIG. 27: Methods implemented in a communication system including a host computer, a base station and a user equipment in accordance with some embodiments.

FIG. 27 is a flowchart illustrating a method implemented in a communication system, in accordance with one embodiment. The communication system includes a host computer, a base station and a UE which may be those described with reference to FIGS. 25 and 26. For simplicity of the present disclosure, only drawing references to FIG. 27 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

Figure 28:
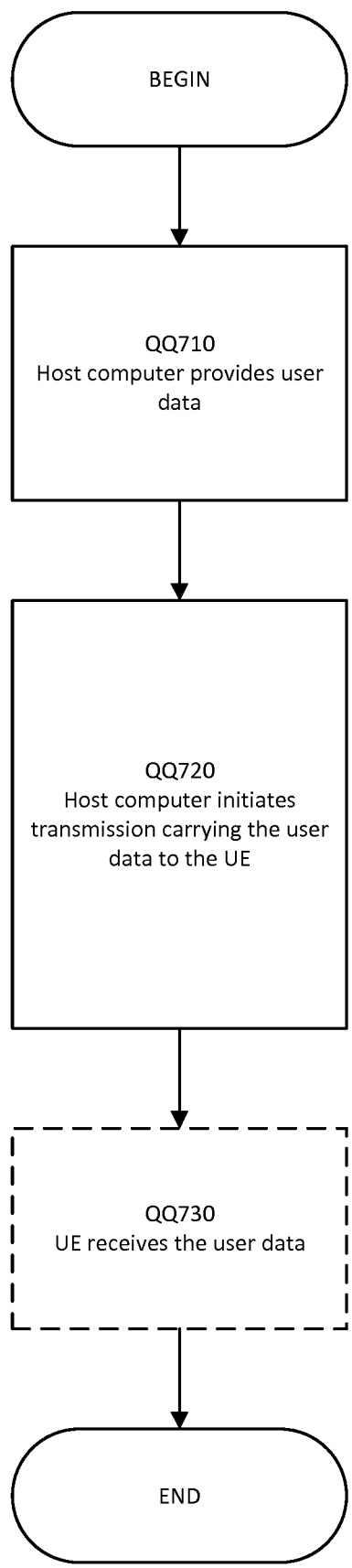
FIG. 28 is a block diagram of methods implemented in a communication system including a host computer, a base station and a user equipment in accordance with some embodiments.

FIG. 28: Methods implemented in a communication system including a host computer, a base station and a user equipment in accordance with some embodiments.

FIG. 28 is a flowchart illustrating a method implemented in a communication system, in accordance with one embodiment. The communication system includes a host computer, a base station and a UE which may be those described with reference to FIGS. 25 and 26. For simplicity of the present disclosure, only drawing references to FIG. 28 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figure 29:
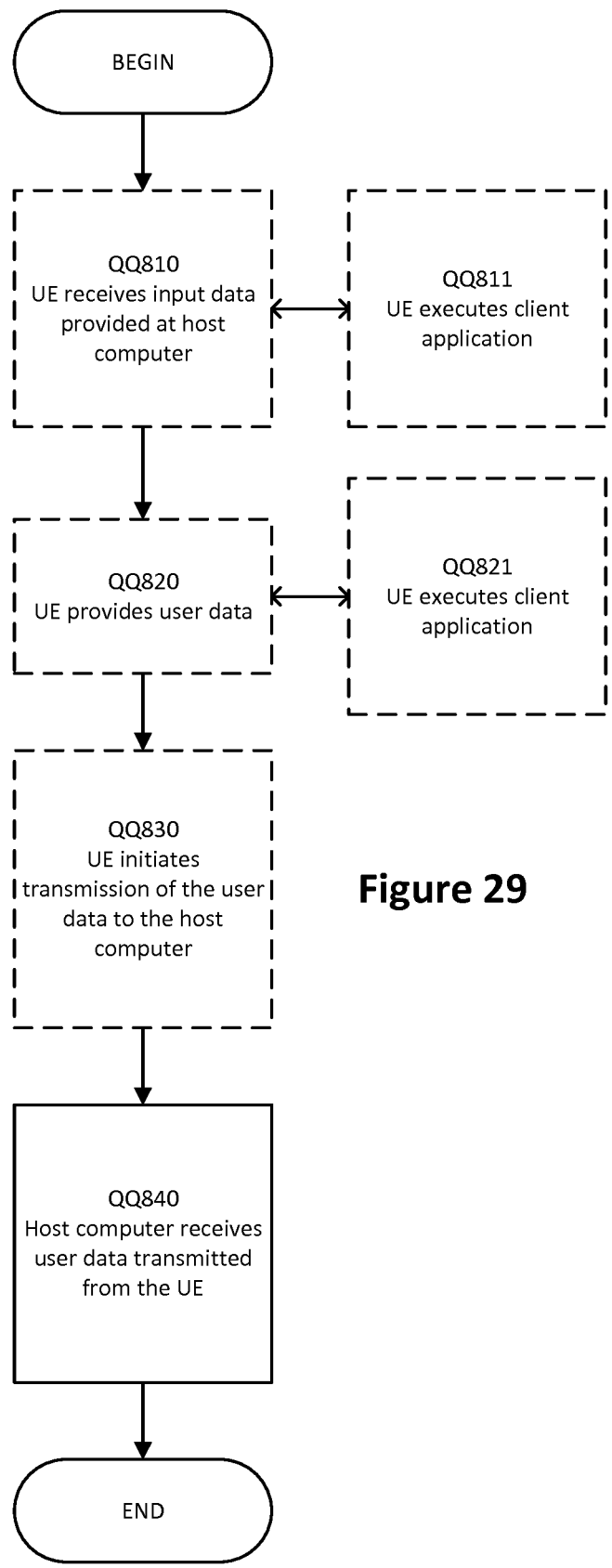
FIG. 29 is a block diagram of methods implemented in a communication system including a host computer, a base station and a user equipment in accordance with some embodiments.

FIG. 29: Methods implemented in a communication system including a host computer, a base station and a user equipment in accordance with some embodiments.

FIG. 29 is a flowchart illustrating a method implemented in a communication system, in accordance with one embodiment. The communication system includes a host computer, a base station and a UE which may be those described with reference to FIGS. 25 and 26. For simplicity of the present disclosure, only drawing references to FIG. 29 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

Figure 30:
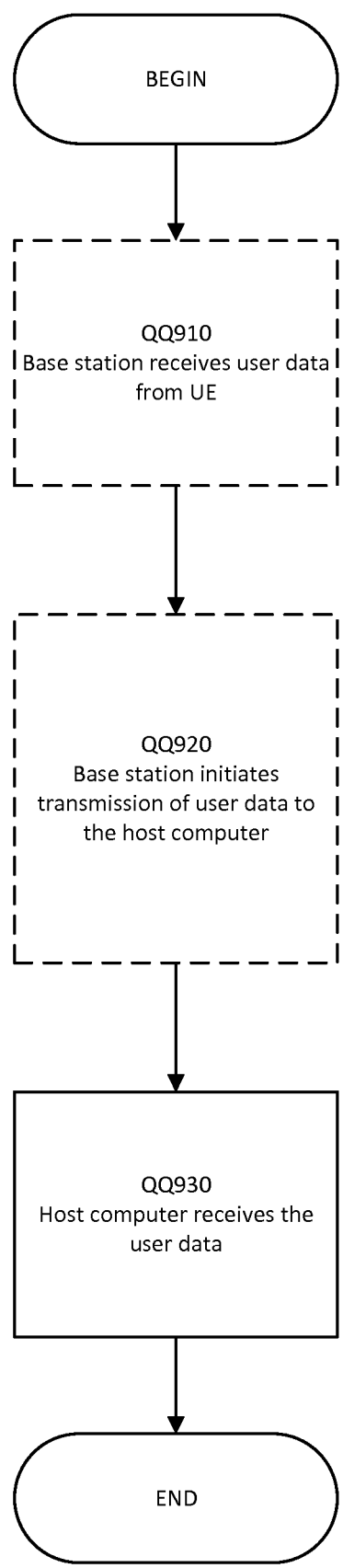
FIG. 30 is a block diagram of methods implemented in a communication system including a host computer, a base station and a user equipment in accordance with some embodiments.

FIG. 30: Methods implemented in a communication system including a host computer, a base station and a user equipment in accordance with some embodiments.

FIG. 30 is a flowchart illustrating a method implemented in a communication system, in accordance with one embodiment. The communication system includes a host computer, a base station and a UE which may be those described with reference to FIGS. 25 and 26. For simplicity of the present disclosure, only drawing references to FIG. 30 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

The invention claimed is:

1. A method of operating a user equipment, UE, for device-to-device, D2D, transmission of a channel state information, CSI, report and/or a CSI reference signal, CSI-RS, the method comprising:
   identifying a CSI selection window containing candidate resources for use in D2D transmission of the CSI report and/or CSI-RS;
   identifying a data selection window containing candidate resources for use in D2D transmission of data and which at least partially overlaps a region of the CSI selection window; and
   controlling transmission of data and the CSI report and/or CSI-RS to use at least one resource that is selected within the overlapping region of the CSI selection window and the data selection window, wherein resource selection for the D2D transmission of both the CSI report and/or CSI reference signal and the data is conducted simultaneously, wherein the CSI selection window includes a first time interval that differs from a second time interval that corresponds to the data selection window.

2. The method of claim 1, wherein the transmission of the CSI report comprises transmission of a CSI report without transmission of CSI-RS or wherein the transmission of the CSI-RS comprises transmission of a CSI-RS without transmission of a CSI report.

3. The method of claim 1, wherein the controlling transmission of the data and the CSI report and/or CSI-RS to use the at least one resource that is selected within the overlapping region of the CSI selection window and the data selection window, comprises:
   selecting a first resource for transmission of the data within the overlapping region of the CSI selection window and the data selection window;
   selecting a second resource for transmission of the CSI report and/or CSI-RS within the overlapping region of the CSI selection window and the data selection window;
   initiating transmission of data using the first resource; and
   initiating transmission of the CSI report and/or CSI-RS using the second resource.

4. The method of claim 3, wherein:
   the selection of the one of the first and second resources is performed independently of the selection of the other one of the first and second resources.

5. The method of claim 3, wherein:
   the selection of the first and second resources is controlled so they are frequency adjacent and in a same slot to each other.

6. The method of claim 5, wherein:
   the selection of the first and second resources to be frequency adjacent and in a same slot to each other is performed responsive to determining that any one or more of the following conditions is satisfied:
   a) no scheduling assignment for the first and second resources is detected by the UE;
   b) a scheduling assignment for one of the first and second resources is detected by the UE but an associated reference signal received power and/or a received signal strength indication measurement is below a first threshold value;
   c) a scheduling assignment for one of the first and second resources is detected by the UE but the associated reference signal received power and/or the received signal strength indication measurement is below a second threshold value; and
   d) a number of available resources within the region of the CSI selection window and the data selection window is above a third threshold value.

7. The method of claim 3, wherein:
   the selection of the first and second resources is controlled so they are frequency nonadjacent and in a same slot to each other.

8. The method of claim 1, wherein the controlling transmission of the data and the CSI report and/or CSI-RS to use the at least one resource that is selected within the overlapping region of the CSI selection window and the data selection window, comprises:
   combining the data and the CSI report and/or CSI-RS into a combined payload;

selecting a resource within the overlapping portion of the selection window and the data selection window; and initiating transmission of the combined payload report using the resource selected.

9. The method of claim 8, wherein the operation to combine the data and the CSI report and/or CSI-RS into a combined payload, comprises:

generating the combined payload by any one or more of: 1) jointly encoding the data and the CSI report and/or CSI-RS; 2) separately encoding the data from the CSI report and/or CSI-RS and then combining the encoded data and the encoded CSI report and/or CSI-RS; 3) performing frequency division multiplexing of the data and the CSI report and/or CSI-RS to provide transmission of the combined payload report; and 4) performing time division multiplexing of the data and the CSI report and/or CSI-RS to provide transmission of the combined payload report.

10. The method of claim 8, further comprising:

signalling an indication of the combined payload in a scheduling assignment associated with the data.

11. The method of claim 8, wherein the controlling transmission of the data and the CSI report and/or CSI-RS to use the at least one resource that is selected within the overlapping region of the CSI selection window and the data selection window, further comprises:

determining whether a condition is satisfied because at least one of the payload and the data is smaller than a defined threshold, and wherein the combining of the data and the CSI report and/or CSI-RS into the combined payload is performed in response to determining that the condition is satisfied.

12. The method of claim 1, wherein the controlling transmission of the data and the CSI report and/or CSI-RS to use the at least one resource that is selected within the overlapping region of the CSI selection window and the data selection window, comprises:

prioritizing transmission of the data over transmission of the CSI report and/or CSI-RS by transmitting the data and not transmitting the CSI report and/or CSI-RS responsive to determining that the overlapping region of the CSI selection window and the data selection window has insufficient resources to performing transmission of both the data and the CSI report and/or CSI-RS.

13. The method of claim 1, wherein the controlling transmission of the data and the CSI report and/or CSI-RS to use the at least one resource that is selected within the overlapping region of the CSI selection window and the data selection window, comprises:

prioritizing transmission of the CSI report and/or CSI-RS over transmission of the data report by transmitting the CSI report and/or CSI-RS and not transmitting the data responsive to determining that the overlapping region of the CSI selection window and the data selection window has insufficient resources to transmit the data.

14. The method of claim 1, wherein the controlling transmission of the data and the CSI report and/or CSI-RS to use the at least one resource that is selected within the overlapping region of the CSI selection window and the data selection window is only performed if a periodicity of transmission of the data is an integer multiple of a periodicity of transmission of the CSI report and/or CSI-RS.

15. The method of claim 1, further comprising:

determining width of the CSI selection window based on measurements of a channel to be used for transmission of the CSI report and/or CSI-RS.

16. A method of operating a network node to control device-to-device, D2D, transmission by a user equipment, UE, of a channel state information, CSI, report and/or a CSI reference signal, CSI-RS, the method comprising:

determining a criteria to be used by the UE for selection of a CSI report and/or CSI-RS transmission resource and a data transmission resource within an overlapping region of a CSI selection window and a data selection window, wherein resource selection for the CSI report and/or CSI-RS transmission resource and the data transmission resource is conducted simultaneously, wherein the CSI selection window includes a first time interval that differs from a second time interval that corresponds to the data selection window; and transmitting an indication of the criteria to the UE.

17. A user equipment, UE, adapted to perform operations for device-to-device, D2D, transmission of a channel state information, CSI, report and/or a CSI reference signal, CSI-RS, the operations comprising:

identifying a CSI selection window containing candidate resources for use in D2D transmission of the CSI report and/or CSI-RS;

identifying a data selection window containing candidate resources for use in D2D transmission of data and which at least partially overlaps a region of the CSI selection window; and controlling transmission of data and the CSI report and/or CSI-RS to use at least one resource that is selected within the overlapping region of the CSI selection window and the data selection window, wherein resource selection for the D2D transmission of the CSI report and/or CSI reference signal and the data is conducted simultaneously, wherein the CSI selection window includes a first time interval that differs from a second time interval that corresponds to the data selection window.

18. A network node adapted to perform operations to control device-to-device, D2D, transmission by a user equipment, UE, of a channel state information, CSI, report and/or a CSI reference signal, CSI-RS, the operations comprising:

determining a criteria to be used by the UE for selection of a CSI report and/or CSI-RS transmission resource and a data transmission resource within an overlapping region of a CSI selection window and a data selection window, wherein resource selection for the CSI report and/or CSI-RS transmission resource and the data transmission resource is conducted simultaneously, wherein the CSI selection window includes a first time interval that differs from a second time interval that corresponds to the data selection window; and transmitting an indication of the criteria to the UE.

* * * * *